United States Patent
Jiang

(10) Patent No.: US 10,574,351 B2
(45) Date of Patent: Feb. 25, 2020

(54) MONITORING PERFORMANCE OF OPTICAL NETWORK EQUIPMENT USING PILOT TONES

(71) Applicant: Zhiping Jiang, Kanata (CA)

(72) Inventor: Zhiping Jiang, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 7 days.

(21) Appl. No.: 15/790,268

(22) Filed: Oct. 23, 2017

(65) Prior Publication Data

US 2019/0123819 A1   Apr. 25, 2019

(51) Int. Cl.
*H04B 10/50* (2013.01)
*H04B 10/079* (2013.01)
*H04B 10/69* (2013.01)

(52) U.S. Cl.
CPC ......... *H04B 10/0795* (2013.01); *H04B 10/50* (2013.01); *H04B 10/691* (2013.01)

(58) Field of Classification Search
CPC combination set(s) only.
See application file for complete search history.

(56) References Cited

U.S. PATENT DOCUMENTS

| | | | |
|---|---|---|---|
| 5,986,499 A | 11/1999 | Myer | |
| 9,485,019 B1* | 11/2016 | Kim | H04B 10/07955 |
| 2002/0154372 A1* | 10/2002 | Chung | H04B 10/0775 |
| | | | 398/187 |
| 2007/0133993 A1* | 6/2007 | Yee | H04B 10/50 |
| | | | 398/85 |
| 2008/0145063 A1* | 6/2008 | Li | H04B 10/40 |
| | | | 398/140 |
| 2012/0170929 A1* | 7/2012 | Xie | H04B 10/0793 |
| | | | 398/33 |
| 2012/0177383 A1 | 7/2012 | Tanimura et al. | |

(Continued)

FOREIGN PATENT DOCUMENTS

| | | |
|---|---|---|
| CN | 102870351 A | 1/2013 |
| CN | 102891824 A | 1/2013 |
| CN | 105991186 A | 10/2016 |

OTHER PUBLICATIONS

USPTO, Filing Receipt of unpublished U.S. Appl. No. 15/479,666, First Named Inventor: Jiang, Zhiping, Application filed Apr. 5, 2017.

(Continued)

*Primary Examiner* — Omar S Ismail
(74) *Attorney, Agent, or Firm* — BCF LLP

(57) ABSTRACT

The present disclosure relates to a method, an apparatus and a system for monitoring performance of optical network equipment. The method comprises receiving an optical channel signal comprising a first pilot tone in a first spectral sub-band of the optical channel signal and a second pilot tone in a second spectral sub-band of the optical channel signal, the first and the second spectral sub-bands being on opposite sides of a reference frequency of the optical channel signal. The performance of the optical network equipment is monitored based on a power mismatch between the first and second pilot tones of the received optical channel signal. An apparatus and a system for monitoring performance of the optical network equipment are also described.

19 Claims, 22 Drawing Sheets

(56) References Cited

U.S. PATENT DOCUMENTS

| | | | |
|---|---|---|---|
| 2014/0376909 A1* | 12/2014 | Frisken | H04J 14/0227 398/26 |
| 2015/0125143 A1* | 5/2015 | Vassilieva | H04B 10/0775 398/33 |
| 2016/0006530 A1* | 1/2016 | Nazarathy | H04J 11/0023 398/76 |
| 2016/0112123 A1* | 4/2016 | Chen | H04B 10/07955 398/38 |
| 2016/0233955 A1 | 8/2016 | Dou et al. | |
| 2016/0301496 A1* | 10/2016 | Eiselt | H04J 14/0227 |
| 2017/0005747 A1* | 1/2017 | Kim | H04J 14/0221 |
| 2017/0082756 A1* | 3/2017 | Parikh | G01S 19/37 |

OTHER PUBLICATIONS

Ruiz et al., Service-triggered Failure Identification/Localization Through Monitoring of Multiple Parameters, Sep. 18-22, 2016, pp. 1136-1138, ECOC 2016—42nd European Conference and Exhibition on Optical Communications, VDE Verlag GMBH, Berlin, Germany.

\* cited by examiner

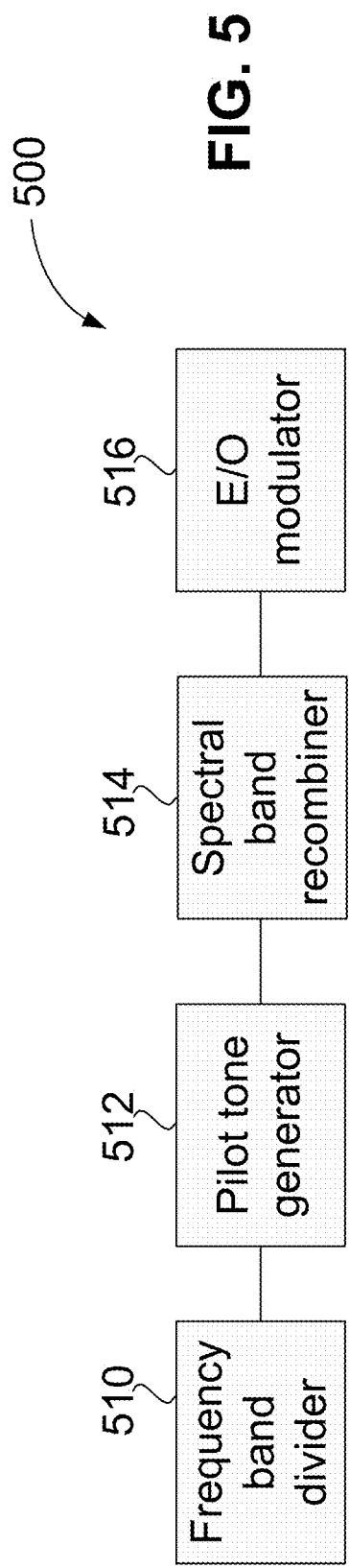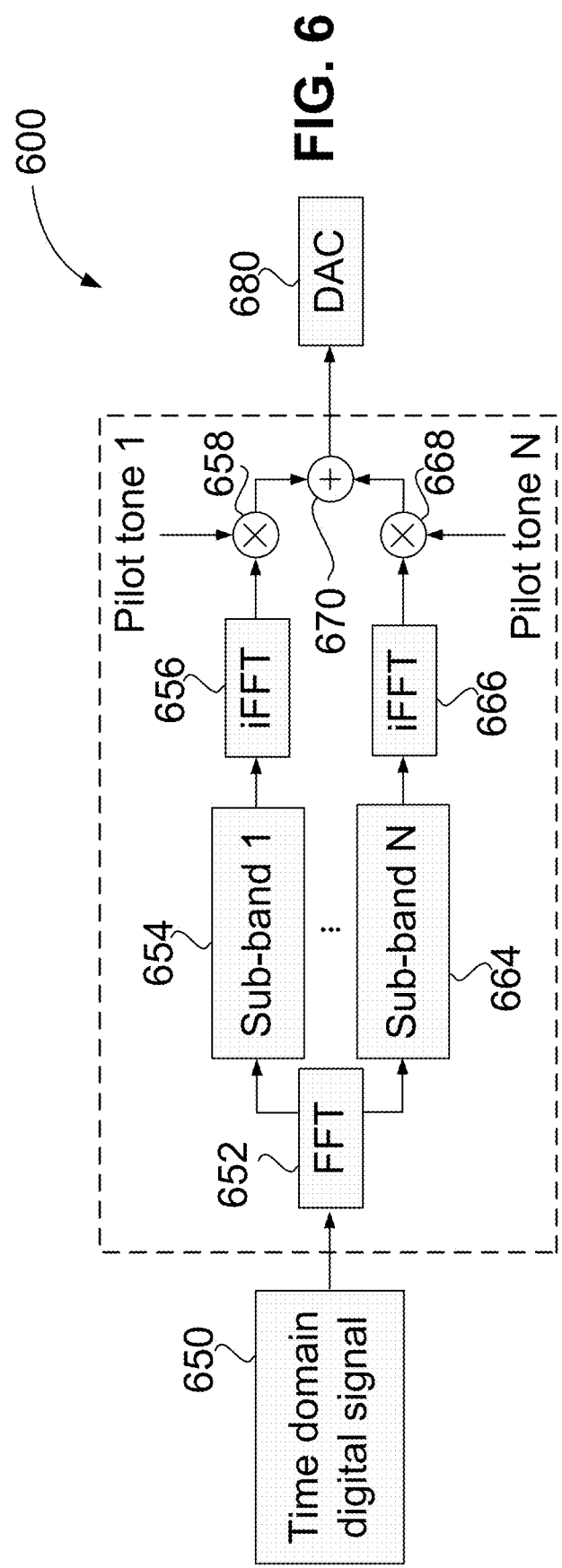

2200

2210 — receiving an optical channel signal comprising a plurality of probing sub-bands collectively forming an entire band of the optical channel signal, a probing pilot tone being present over the entire band of the optical channel signal while being silent consecutively over each one of the probing sub-bands of the plurality of probing sub-bands 2220 — obtaining a spectrum of the optical channel signal based on time-varying power level of the probing pilot tone

FIG. 22

MONITORING PERFORMANCE OF OPTICAL NETWORK EQUIPMENT USING PILOT TONES

TECHNICAL FIELD

The present disclosure relates to the field of optical networks and in particular to monitoring performance of the optical networks.

BACKGROUND

A typical optical network, for example a dense wavelength division multiplex (DWDM) network, has many passive and active optical components. These optical components should have stable characteristics for reliable network operation. In particular, the optical components should have stable position and width of optical frequency passbands. Various factors may alter the frequency passbands of the optical components and can cause, for example, a frequency shift/offset of the passband resulting in an asymmetric narrowing of the passband. When propagating through many such components, a wavelength channel signal can undergo a significant spectral narrowing, causing penalties and faults in the optical network.

Improvements are therefore needed in monitoring performance of optical network equipment and, in particular, spectral performance of optical networks passive and active optical filtering and wavelength selective network components and modules, to improve spectrum utilization efficiency of optical networks.

SUMMARY

It is an object of the present disclosure to provide a technique to monitor performance of an optical network and in particular of optical network equipment.

Generally stated, the present disclosure provides methods, systems and apparatuses for receiving an optical channel signal having pilot tones in corresponding sub-hands of the optical channel signal and performing optical network equipment monitoring based on such pilot tones.

When propagating through optical network equipment, an optical channel signal may experience spectral narrowing caused by different frequency passbands of the optical network equipment. An asymmetric filtering may occur when the central frequency of the optical channel signal shifts while propagating through one or more optical filters of the optical network. A relative frequency shift may be caused by the optical channel signal's shift and/or frequency shift of the one or more optical filters' passbands. A symmetric spectrum narrowing may occur when the bandwidth of the optical channel signal narrows and the central frequency of the optical channel signal remains the same while propagating through one or more optical filters of the optical network. Spectrum narrowing caused by either asymmetric filtering or symmetric spectrum narrowing may result in significant losses and faults in the optical network.

The technology as disclosed herein may help to detect and analyze both central frequency shift and spectral narrowing of the optical channel signal while the optical channel signal propagates through the optical network equipment.

According to one aspect of the disclosed technology, there is provided a method for monitoring performance of optical network equipment. The method comprises receiving an optical channel signal and monitoring performance of optical network equipment. The optical channel signal comprises: a first pilot tone in a first spectral sub-band of the optical channel signal, and a second pilot tone in a second spectral sub-band of the optical channel signal, the first and the second spectral sub-bands being on opposite sides of a reference frequency of the optical channel signal. Monitoring performance of optical network equipment is based on a power mismatch between the first and second pilot tones of the received optical channel signal.

According to another aspect of the disclosed technology, there is provided a method for optical spectrum monitoring. The method comprises receiving an optical channel signal comprising a first plurality of probing sub-bands, different ones of the probing sub-bands of the first plurality consecutively having a first probing pilot tone; and obtaining a spectrum of the optical channel signal based on time-varying power level of the first probing pilot tone.

According to a further aspect of the disclosed technology, there is provided a method for optical spectrum monitoring. The method comprises: receiving an optical channel signal comprising a first plurality of probing sub-bands collectively forming an entire band of the optical channel signal, a first probing pilot tone being present over the entire band of the optical channel signal while being silent consecutively over each one of the probing sub-bands of the first plurality of the probing sub-bands. The method further comprises obtaining a spectrum of the optical channel signal based on time-varying power level of the first probing pilot tone.

According to a further aspect of the disclosed technology, there is provided a system. The system comprises: a transmitter configured to transmit an optical channel signal over an optical network, the optical channel signal comprising: a first pilot tone applied to a first spectral sub-band of the optical channel signal and a second pilot tone applied to a second spectral sub-band of the optical channel signal. The first and the second spectral sub-bands are on opposite sides of a reference frequency of the optical channel signal. The system further comprises a photodetector, configured to receive the optical channel signal, and a processor, configured to monitor performance of optical network equipment based on a power mismatch between the first and second pilot tones of the received optical channel signal.

According to a further aspect of the disclosed technology, there is provided an optical network monitoring apparatus. The optical network monitoring apparatus comprises a photodetector configured to receive an optical channel signal comprising a first pilot tone in a first spectral sub-band of the optical channel signal, and a second pilot tone in a second spectral sub-band of the optical channel signal. The first and the second spectral sub-bands are on opposite sides of a reference frequency of the optical channel signal. The optical network monitoring apparatus also comprises a processor configured to monitor performance of optical network equipment based on a power mismatch between the first and the second pilot tones of the received optical channel signal.

According to a further aspect of the disclosed technology, there is provided a non-transitory computer readable medium with computer executable instructions stored thereon that, when executed, cause a processor to: obtain an amplitude of a first pilot tone associated with a first spectral sub-band of an optical channel signal; obtain an amplitude of a second pilot tone associated with a second spectral sub-band of the optical channel signal, the first and the second spectral sub-bands being on opposite sides of a reference frequency of the optical channel signal; and monitor performance of an optical network equipment based on a power mismatch between the first and the second pilot tones of the received optical channel signal.

The executable instructions may cause the processor to detect at least one of: a relative frequency offset between the optical channel signal and a filter bandwidth of an optical filter of the optical network based on the power mismatch. The executable instructions may also cause the processor to: generate an alarm if the relative frequency offset exceeds a filter frequency offset threshold. The executable instructions may also cause the processor to determine at least one optical network equipment tuning parameter.

In some implementations, the first pilot tone has a first pilot tone frequency and the second pilot tone has a second pilot tone frequency different from the second pilot tone frequency.

The first and second pilot tones may be present simultaneously in the respective first and second spectral sub-bands of the optical channel signal.

In some implementations, the first pilot tone is present during a first time interval and the second pilot tone is present during a second time interval different from the first time interval.

The reference frequency may be a center frequency of the transmitted optical channel signal.

The technology may further comprise determining a relative frequency offset of the optical channel signal based on the power mismatch.

The technology may further comprise generating an alarm if the relative frequency offset exceeds a frequency offset threshold.

Monitoring performance of the optical network equipment may further comprise monitoring performance of an optical filter of the optical network. The technology may further comprise determining a relative frequency offset of a filter bandwidth of the optical filter based on the power mismatch.

Monitoring performance of the optical network equipment may further comprise monitoring performance of at least one of a wavelength selective switch, an arrayed waveguide grating, and a laser light source of the optical network.

Implementations of the present disclosure each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments of the present disclosure will be described by way of example only with reference to the accompanying drawings, in which:

FIG. 5 is a block diagram of an apparatus for applying different pilot tones to different sub-bands of the transmitted optical channel signal, in accordance with one embodiment;

FIG. 6 is a block diagram of an apparatus for applying two or more different pilot tones to two or more different respective sub-bands of the transmitted optical channel signal, in accordance with one embodiment;

FIG. 22 is a sequence diagram of the optical spectrum monitoring method, in accordance with yet another embodiment.

Like numerals represent like features on the various drawings.

DETAILED DESCRIPTION

Various aspects of the present disclosure generally address one or more of the problems of spectrum narrowing of an optical channel signal.

Generally, embodiments of the present disclosure provide methods and apparatuses for receiving and using pilot tones to monitor performance of an optical network based on such pilot tones.

Figure 1:
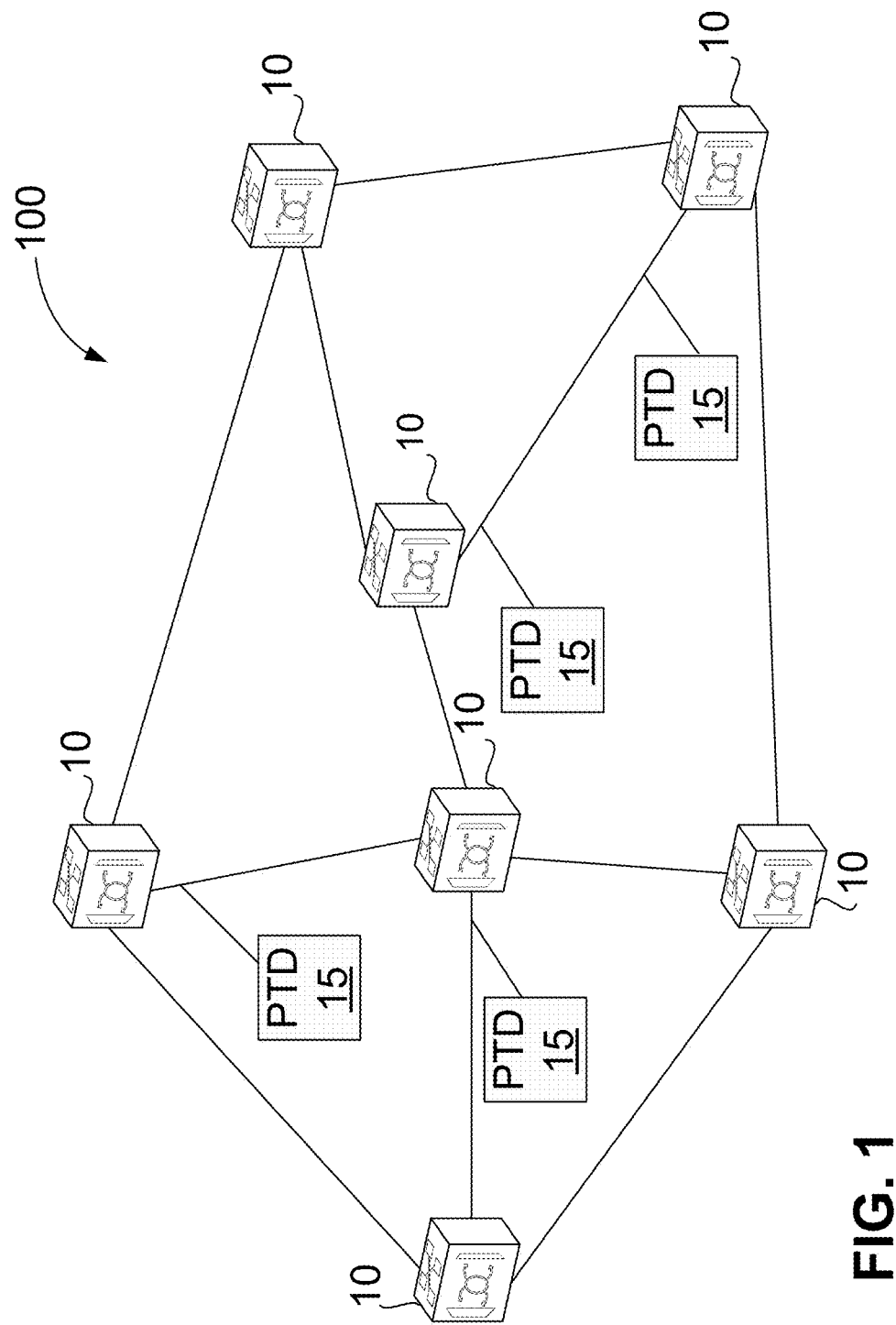
FIG. 1 is a schematic block diagram of an optical network.

Referring now to the drawings, FIG. 1 shows an optical network 100. Such optical network 100 typically has a plurality of nodes, each node may include an optical add-drop multiplexer, such as a reconfigurable optical add-drop multiplexer (ROADM) 10, having at least one wavelength selective switch (WSS). The optical network 100 may also have one or more laser light sources and a plurality of optical amplifiers, e.g. erbium-doped fiber amplifiers, for amplifying optical signals. The light sources and optical amplifiers are omitted in FIG. 1 for simplicity.

The optical network equipment, as referred to herein, comprises one or more passive and/or active optical network components and/or modules of the optical network 100, including, but not limited to, optical filters, optical links, WSSs, arrayed waveguide gratings, and laser light sources.

The optical network 100 typically transmits a plurality of optical wavelength channels. Throughout the present disclosure, the term "wavelength channels" denotes modulated optical signals at particular wavelengths and is also referred to herein as "channels". Each of the channels is characterized by a channel bandwidth and a channel central frequency, typically defined by a frequency grid.

In the optical network 100, a continuous pilot tone signal may be used to monitor the channel power. The pilot tone is a low-frequency modulation (e.g. kHz to MHz) applied to a high-speed optical channel. The pilot tone provides an in-band ancillary channel for performance monitoring.

Each channel is modulated with a different pilot tone. For example, different frequencies of modulation can be applied to different channels. Different spreading sequence may also be applied for spectra-spread pilot tones. Accordingly, a power of a particular pilot tone may be used for indicating the power of the high speed optical channel in a wavelength division multiplexed (WDM) system. The pilot tone may be further modulated to carry channel characterizing information.

Referring again to FIG. 1, the network 100 includes a plurality of pilot tone detectors (PTD) 15 which may be installed at various locations of the optical network 100 to monitor channel information using the pilot tone. The presence and optical power level of individual wavelength channels, modulation format, baud rate, and/or other channel characteristics may be monitored using the PDTs 15.

It should be appreciated that each PTD 15 may include a low-speed photodiode, amplification circuitry, analog-to-digital (A/D) converter, and a processor (internal components of the PTD 15 are not shown). A/D converter digitizes the signal which then can be processed by the processor.

Figure 2:
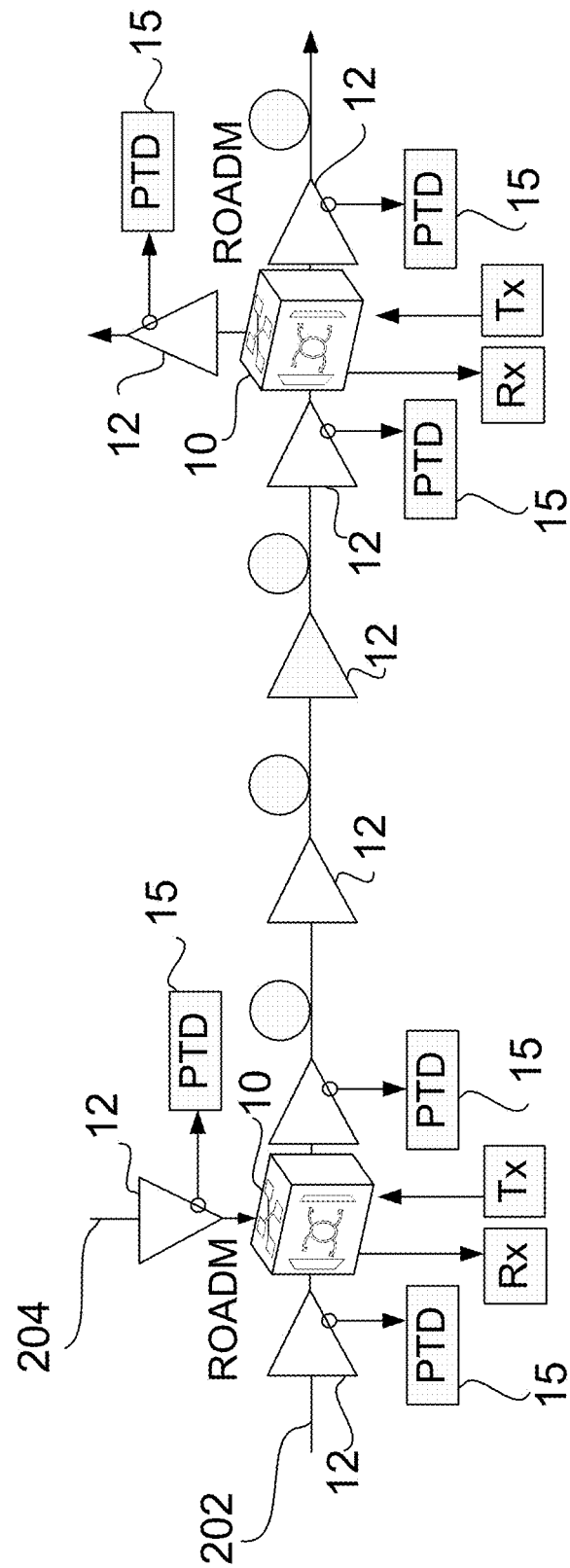
FIG. 2 is a schematic block diagram of a link between two reconfigurable optical add-drop multiplexers (ROADMs)

FIG. 2 illustrates more details of a link between two ROADMs 10 of FIG. 1. One ROADM 10 of FIG. 2 can receive one or more DWDM signals 202, 204, drop one or more channels from the DWDM signals 202, 204 at a receiver Rx, add one or more channels generated by a transmitter Tx, and pass through other channels. The signals may be added or dropped using a WSS (shown in a later Figure). A transmitter Tx includes a laser light source (not shown). In some cases, dropped channels are converted from optical to electrical domain, and added channels are converted from electrical to optical domain. Otherwise, channels are switched or passed through in the optical domain. The signal may be amplified with optical amplifiers 12.

ROADMs 10 may include one or more optical filters. By way of a non-limiting example, a WSS of the ROADM 10 acts as a spectral filter for a wavelength channel routed by the WSS. Each filter is characterized by a passband and a bandwidth, which may drift in time.

As referred to herein, the term "transmitted optical channel signal" refers to optical channel signal before propagating through the optical network equipment. As referred to herein, the term "received optical channel signal" refers to optical channel signal after propagating through the optical network equipment.

Figure 3:
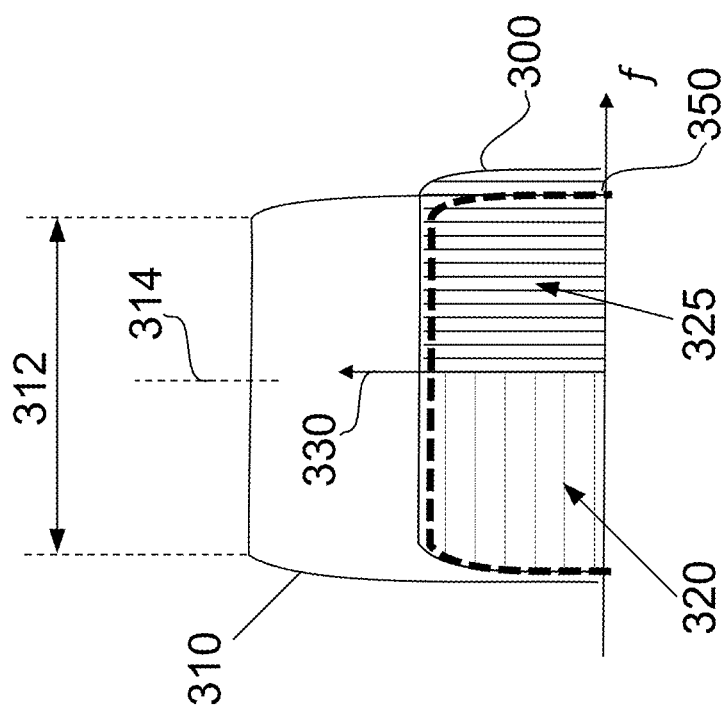
FIG. 3 is a schematic view of spectra of transmitted and received optical channel signals, where the received optical channel signal has experienced an asymmetric filtering after propagation though an optical filter.

Referring now to FIG. 3, a schematic view of spectra of an optical channel signal before 300 and after 350 propagating through an optical filter having a center frequency 314 and a passband 310 are presented. In FIG. 3, the filter passband 310 has a frequency shift compared to the transmitted optical channel signal 300.

Because of a relative frequency offset between the reference frequency 330 of the transmitted optical channel signal 300 and the filter center frequency 314, as shown at FIG. 3, the transmitted optical channel signal 300 is filtered asymmetrically when passed through the optical filter. After propagating through the optical filter, the received optical channel signal 350 may have narrower spectrum bandwidth compared to the transmitted optical spectrum 300 and a shifted central frequency compared to the central frequency of the transmitted optical spectrum 300. Spectrum narrowing caused by an asymmetric filtering may occur after the transmitted optical channel signal 300 has propagated through the optical filter.

The asymmetric filtering may result in detuning, spectral narrowing of the optical channel signal, causing losses and/or faults in the optical network 100.

Similar asymmetric filtering may occur when the transmitted optical channel signal 300 propagates through other optical network equipment of the optical network 100.

Figure 4:
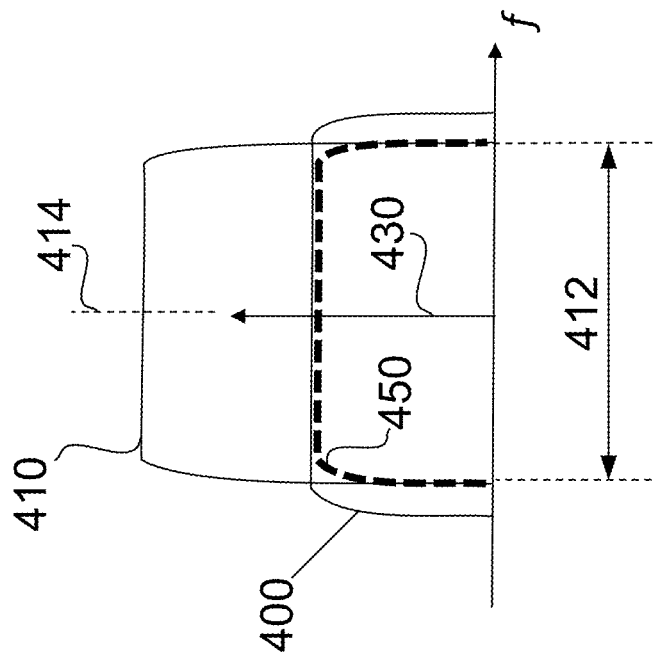
FIG. 4 is a schematic view of spectra of transmitted and received optical channel signals, where the received optical channel signal has experienced symmetric spectrum narrowing after propagation though an optical filter.

Filtering effects in various optical network equipment may also cause a symmetric spectrum narrowing of the optical channel signal. FIG. 4 shows symmetric spectrum narrowing occurring when the optical filter's passband 410 is narrower than the transmitted optical channel signal's 400 passband, while the central frequency 414 of the optical filter is approximately the same as the central frequency 430 of the transmitted optical channel signal 400. The optical spectrum of the received optical channel signal 450 after propagation through the optical filter 410 may remain symmetrical but may have a narrower optical signal bandwidth, determined by the optical filter bandwidth 412.

Such symmetric spectrum narrowing may be a result of a narrower bandwidth of one optical device, such as an optical filter, a WDM, a wavelength selective switch, an add/drop module, and other equipment.

The symmetric spectrum narrowing of the optical channel signal may also be a result of the transmitted optical channel signal propagating through several optical devices. Each of those optical devices may provide an asymmetrical filtering. For that reason, the optical spectrum of the received optical channel signal may be symmetric with regards to the reference frequency (e.g. center frequency of the received optical channel signal) and may have a narrower optical signal bandwidth. The symmetric spectrum narrowing, which occurs due to one optical device and/or due to a plurality of optical devices, may also cause performance degradation and/or faults in the optical network 100.

Referring back to FIG. 3, in at least one embodiment, two distinct pilot tones may be applied to the transmitted optical channel signal 300. In such embodiment, a first pilot tone is applied to a first spectral sub-band 320 of the optical channel signal and a second pilot tone is applied to a second spectral sub-band 325. The first and the second spectral sub-bands 320, 325 may be located on opposite sides of a reference frequency 330 of the optical channel signal 300. The reference frequency 330 may be a carrier frequency (for a laser light source), referred herein as a center frequency of the transmitted optical channel signal 300.

FIG. 5 shows a block diagram of an apparatus 500 for applying different pilot tones to different sub-bands of the transmitted optical channel signal 300, in accordance with one embodiment. The apparatus 500 may include a frequency band divider 510 for spectrally dividing a time domain digital signal into a plurality of spectral sub-bands, and a pilot tone generator 512 for applying a respective pilot tone to each of two or more spectral sub-bands to produce a respective spectral sub-band with applied pilot tone. The frequency band divider 510 may not be necessary for embodiments in which the input is multiple digital sub-band signals. The apparatus 500 may also include a spectral band recombiner 514 for recombining the spectral sub-bands with applied pilot tones and any remaining spectral sub-bands, to which pilot tones were not applied, to produce a recombined time domain digital signal. The apparatus 500 also includes an electrical-to-optical modulator 516 for converting the recombined time domain digital signal for transmission.

FIG. 6 shows a block diagram of another embodiment of an apparatus 600 for applying two or more (N) different pilot tones to two or more different N respective sub-bands of the transmitted optical channel signal 300. The apparatus 600 includes a fast Fourier transform (FFT) module 652 converting a time domain digital signal 650 into a frequency domain signal. The frequency domain signal is then split into N multiple sub-bands 654, 664. Each sub-band is then converted back to a respective time domain digital signal with a respective inverse FFT (IFFT) 656, 666. Note that components 652, 654, 656, 664, 666 collectively are a specific example of the frequency band divider 510 of FIG. 5. Multipliers 658, 668 are used to apply respective pilot tone modulations to the N time domain digital signals, and the N pilot tone modulated signals are recombined at 670 prior to digital to analog conversion 680.

The apparatuses 500, 600 may be used to apply the first and the second pilot tones to the first and the second spectral sub-bands 320, 325. In this case, the number of pilot tones N at FIG. 6 equals 2. Respectively, the number of sub-bands also equals 2.

In at least one embodiment, the apparatuses 500, 600 may be part of the transmitter Tx of the optical network 100.

Figure 7:
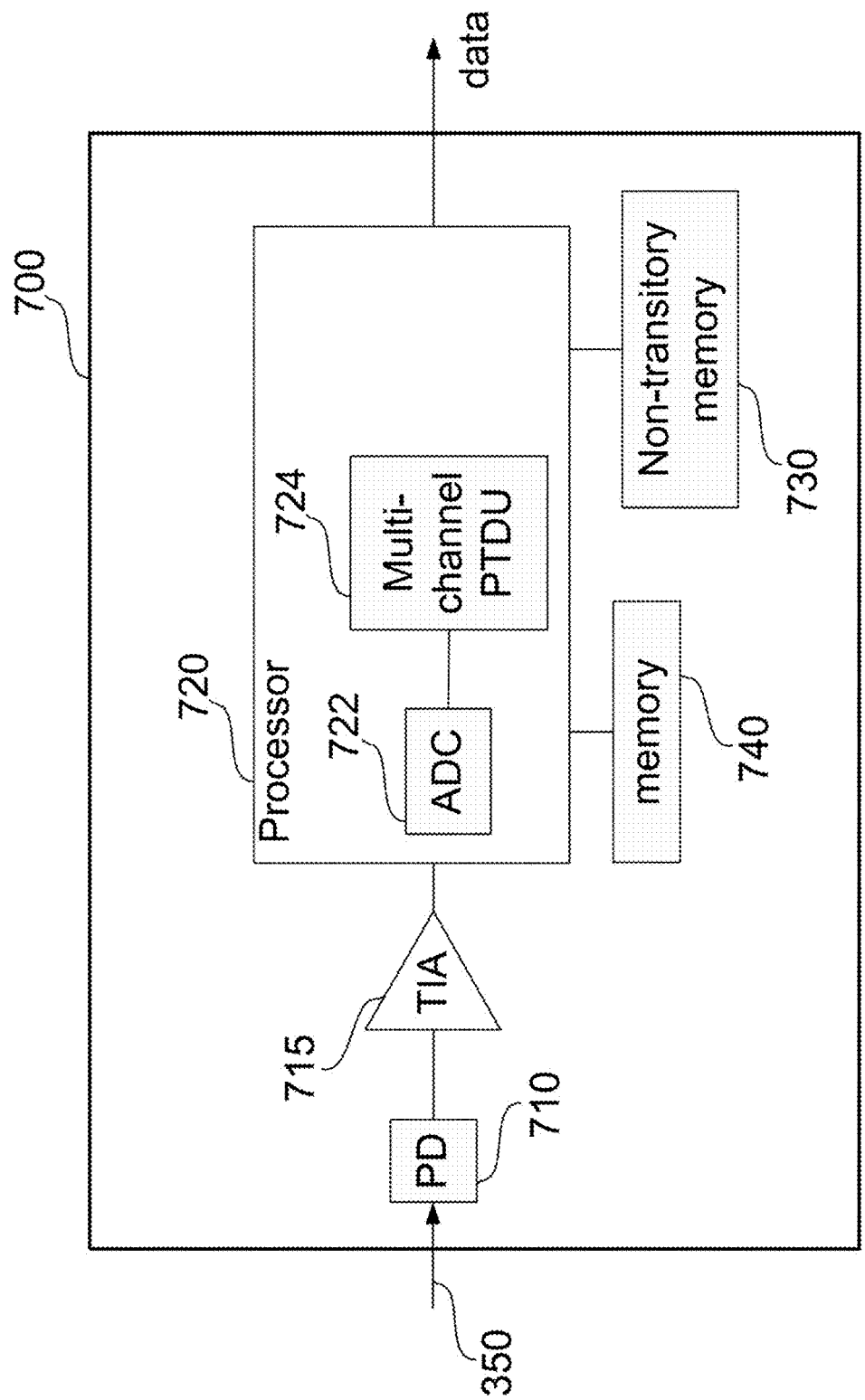
FIG. 7 is a block diagram of an optical network equipment monitoring apparatus, in accordance with one embodiment.

Referring now to FIG. 7, an optical network equipment monitoring apparatus 700 for monitoring the optical network 100 comprises a photodetector (PD) 710, a processor 720, a non-transitory computer readable medium 730 and a memory 740. It should be understood that the non-transitory computer readable medium 730 and the memory 740 may be separate or combined in one device. In accordance with at least one embodiment, the photodetector 710 is configured to receive the optical channel signal 350 that has the first and the second pilot tones in the first and the second spectral sub-bands 320 and 325. The photodetector 710, e.g. a photodiode, converts optical signal to electrical signal. The optical network equipment monitoring apparatus 700 may further include a transimpedance amplifier (TIA) 715. The processor 720 may also include an analog-to-digital converter (ADC) 722 for digitizing an output analog signal from the photodetector 710 and a multi-channel pilot tone detection unit (PTDU) 724. The power of each pilot tone may be determined by digital signal processing.

In at least one embodiment, the non-transitory computer readable medium 730 has computer executable instructions stored thereon. When executed, the computer executable instructions cause the processor 720 to monitor performance of the optical network 100 based on a power mismatch as discussed herein. The instructions also cause the processor 720 to receive a first pilot tone and a second pilot tone. The first pilot tone is extracted from a first spectral sub-band 320 of the received optical channel signal 350. The second pilot tone is extracted from a second spectral sub-band 325 of the received optical channel signal 350. The first and the second spectral sub-bands 320, 325 are on opposite sides of a reference frequency 330 of the optical channel signal 300. The processor 720 may also receive an identifier of the first spectral sub-band 320, and an identifier of the second spectral sub-band 325. The identifiers of the first and the second spectral sub-bands 320, 325 may include information about positions of the first and the second spectral sub-bands 320, 325 within the spectrum of the optical channel signal 300. The processor 720 may digitally extract the identifiers from the pilot tones. For example, one or more bits of the pilot tone may contain the identifier. The instructions also cause the processor 720 to monitor performance of an optical network equipment based on a power mismatch between the first and the second pilot tones 320, 325 of the received optical channel signal 350.

It should be understood that the photodetector 710 may detect a plurality of optical channels simultaneously. The multi-channel PTDU 724 may be implemented with digital signal processing (DSP) and may detect pilot tones in each of the optical channels.

Referring back to FIGS. 1 and 2, in order to monitor the performance of the optical network equipment, plural instances of the optical network equipment monitoring apparatus 700 may be installed in the optical network 100, for example in the locations where the PTDs 15 are installed. The optical network equipment monitoring apparatuses 700 may be installed instead of or in parallel with PTDs 15.

Figure 8:
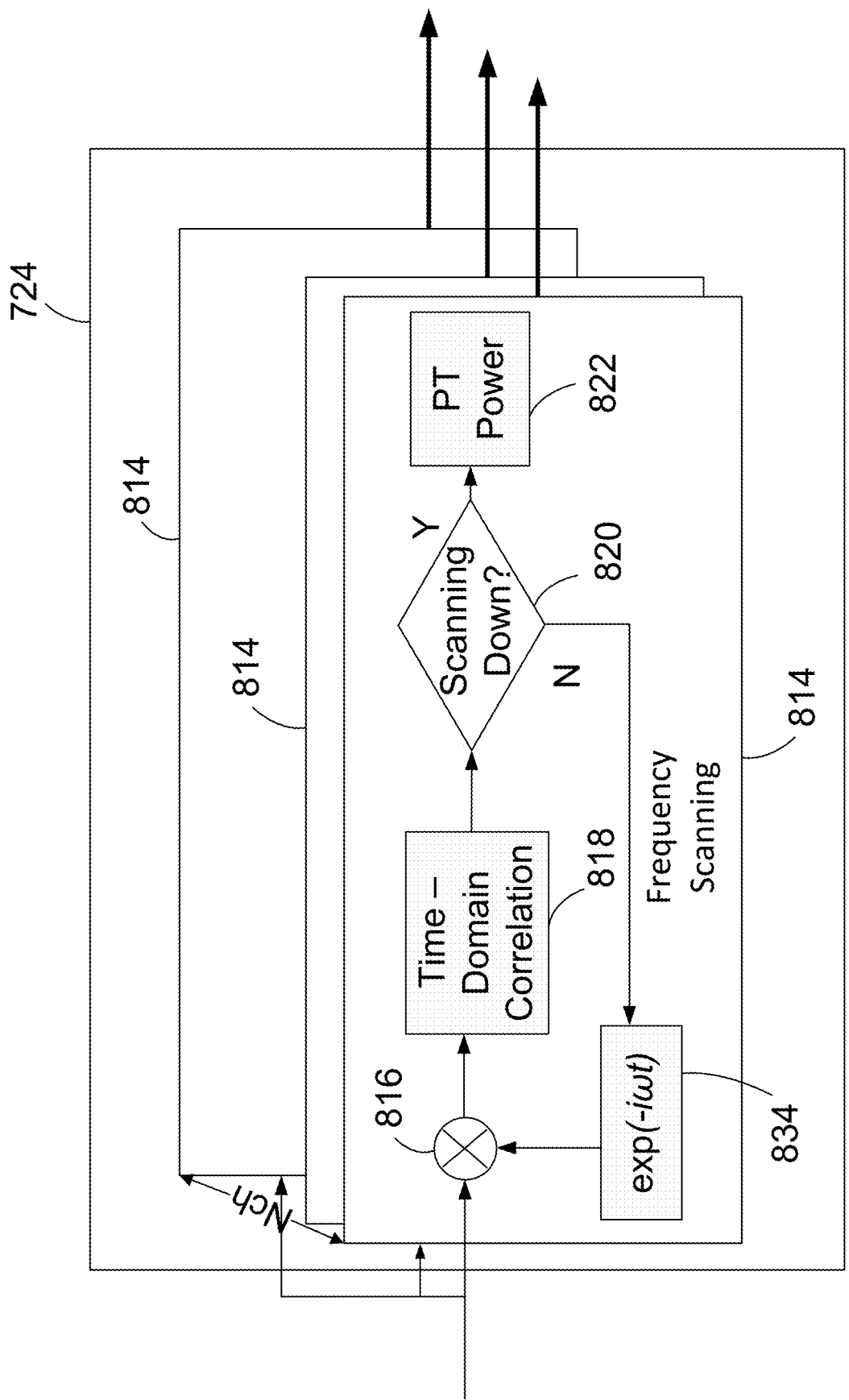
FIG. 8 is a block diagram of the multi-channel pilot tone detection unit, in accordance with one embodiment.

FIG. 8 shows the multi-channel pilot tone detection unit (PTDU) 724, in accordance with one embodiment. The multi-channel pilot tone detection unit 724 may include a plurality of channel detection units 814. There is one channel detection unit 814 for each channel in this embodiment. In the embodiment of FIG. 8, each channel detection unit 814 includes a mixer 816 for mixing the signal received from the ADC 722 with a down-shifting factor 834, having a circular frequency ω, to shift the signal frequency down to zero carrier frequency. Each detector 814 also includes a time-domain correlator (or "time-domain correlation module") 818 and a decision block 820 which determines if the frequency scanning has been completed. If the scanning has been completed, then the pilot tone power is extracted. Otherwise, the frequency scanning continues by incrementing or decrementing the circular frequency ω of the down-shifting factor 834. Each channel detection unit 814 includes a pilot tone power processing module 822 for extracting the optical power from the maximum correlation peak value after the frequency scanning is performed.

Figure 9:
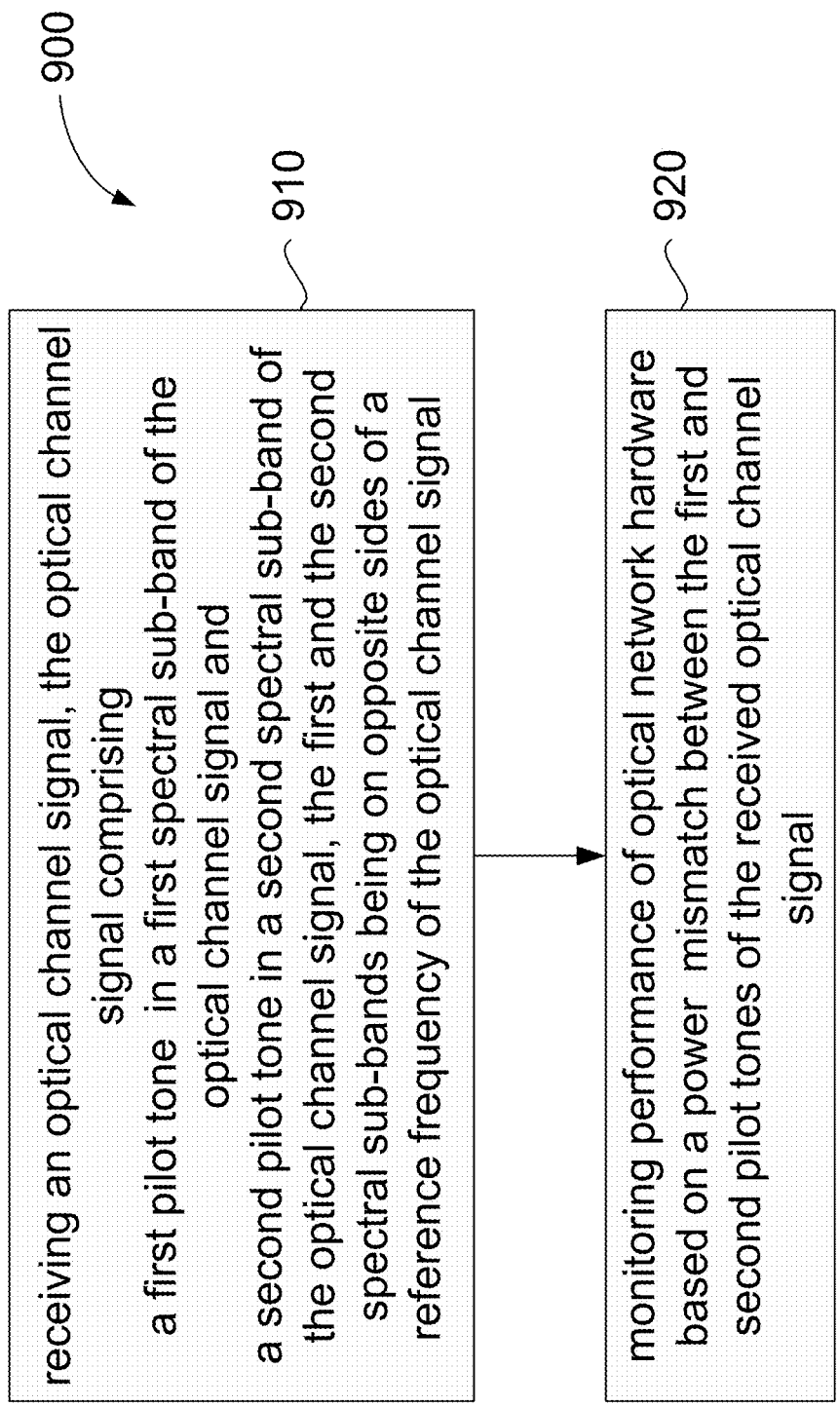
FIG. 9 is a sequence diagram of a method for optical network equipment monitoring, in accordance with one embodiment.

Referring now to FIG. 9 with further reference to FIGS. 3 and 4, shown therein is a flow chart of a method 900 of monitoring performance of the optical network equipment, in accordance with a first embodiment. The method 900 comprises receiving 910 the optical channel signal 350 (FIG. 3) comprising a first pilot tone in the first spectral sub-band 320 of the optical channel signal 350. A second pilot tone is received in a second spectral sub-band 325 of the optical channel signal 350. As shown in FIG. 3, the first and the second spectral sub-bands 320, 325 are on opposite sides of the reference frequency 330. The method 900 also comprises monitoring 920 performance of the optical network 100 based on a power mismatch between the first and the second pilot tones of the received optical channel signal 350.

For example, the power mismatch may be calculated as a power ratio between the first and the second pilot tones in the received optical channel signal 350.

Figure 10:
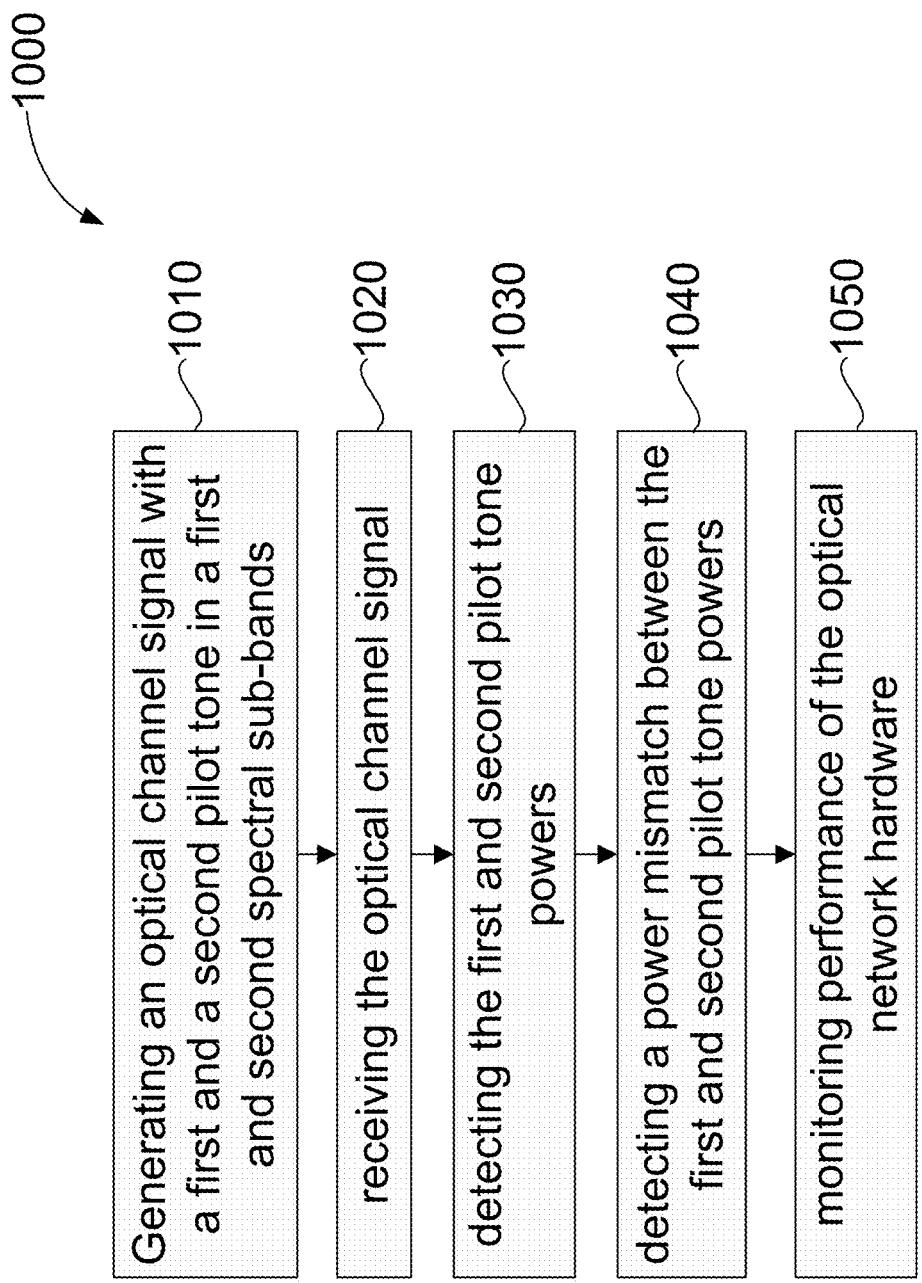
FIG. 10 is a sequence diagram of the method for optical network equipment monitoring, in accordance with another embodiment.

FIG. 10 shows a flow chart of a method 1000 for monitoring performance of the optical network equipment, in accordance with a second embodiment. At operation 1010, the optical channel signal 300 (FIG. 3) is generated at the apparatus 500, 600 (FIGS. 5 and 6, respectively) for applying pilot tones to different sub-bands of the network 100 with a first and a second pilot tone in the first and second sub-bands 320, 325, the first and the second spectral sub-bands being on opposite sides of the reference frequency 330 of the transmitted optical channel signal 300. At operation 1020, the optical channel signal 350 is received at the optical network equipment monitoring apparatus 700.

The first and second pilot tone powers are detected at operation 1030. A power mismatch is detected between the first and second pilot tone powers at operation 1040 in order to perform monitoring of the optical network equipment at operation 1050.

The detected power mismatch may be further analyzed by the processor 720, stored in the memory 740, and/or displayed on a screen (not shown) operatively connected to the processor 720.

Figure 11:
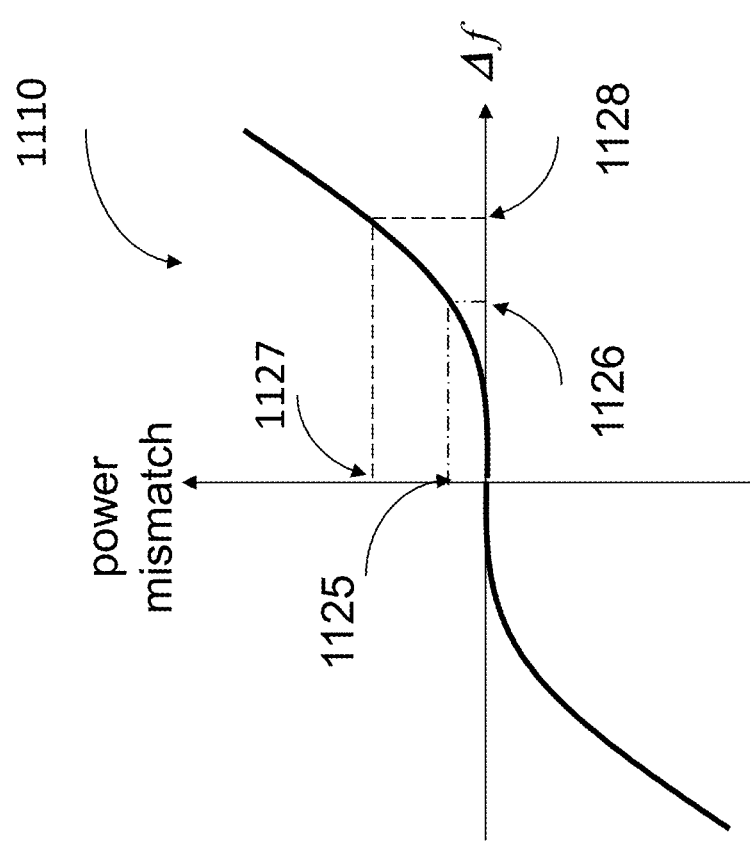
FIG. 11 is a schematic view of a dependence of the power mismatch on the frequency offset.

Referring now to FIG. 11, shown therein is a schematic view of a dependence of the power mismatch 1110 on a relative frequency offset Δf. The relative frequency offset Δf may be calculated as an offset of filter center frequency 314 from the reference frequency 330 (e.g. a central frequency of the transmitted optical channel signal 300) of the transmitted optical channel signal 300.

The dependence of the power mismatch 1110 on the relative frequency offset Δf as shown at FIG. 11, may be obtained (calculated) by the processor 720 when the transmitted optical channel signal 300 propagates through optical network equipment. For example, the processor 720 may compare the power mismatch with power mismatch thresholds 1125, 1127.

It should be understood that, depending on the method of calculation of the power mismatch 1110 and of the relative frequency offset Δf, higher values of the power mismatch 1110 may alternatively indicate asymmetric filtering either towards lower or higher frequencies compared to the reference frequency 330.

In at least one embodiment, the memory 740 may receive and store values of different power mismatch thresholds 1125, 1127 and/or corresponding frequency offset thresholds 1126, 1128. The processor 720 may generate an alarm if the power mismatch 1110, detected by the processor 720, exceeds the power mismatch thresholds 1125 and/or 1127. Alternatively, the processor 730 may determine the relative frequency offset and then compare the determined relative frequency offset with the frequency offset thresholds 1126, 1128. The alarm may be, for example, sent by the processor 720 to another device and/or be collected in a database.

In at least one embodiment, the first and second pilot tones may respectively have a first pilot tone frequency and a second pilot tone frequency. The difference between the first and second pilot tone frequencies may be determined, for example, based on a frequency dependence of a response curve of the photodiode of the photodetector 710 (responsivity versus frequency/wavelength). Such difference between the first and second pilot tone frequencies may be chosen to be small, for example, about or lower than 100 kHz, to overcome eventual differences in the response of the photodiode at different frequencies. For example, the difference between the first and second pilot tone frequencies may be approximately equal to or less than 10% of their values. The first and the second pilot tone frequencies may be 30 MHz±5% for one optical channel signal, 31 MHz±5% for another optical channel signal, etc. Alternatively, the frequencies of the first and second pilot tones may be periodically swapped in order to average the response difference for these two frequencies.

The first and second pilot tones may either be applied simultaneously to the first and second sub-bands of the transmitted optical channel signal 300, or may be applied in distinct timeslots. For example, the first pilot tone may be applied at a first frequency and the second pilot tone at a second frequency, and later, the first pilot tone may be applied at the second frequency and the second pilot tone may be applied at the first frequency.

In at least one embodiment, the first and second pilot tones may have a same frequency. To facilitate detection of the pilot tones in the received channel, the pilot tones may be applied at different time intervals, in a so-called interleaved manner. For example, the first pilot tone may be applied during a first time interval and the second pilot tone may be applied during the second time interval, different from the first time interval. This operation may be repeated and averaged to improve accuracy of the measurements.

Figure 12:
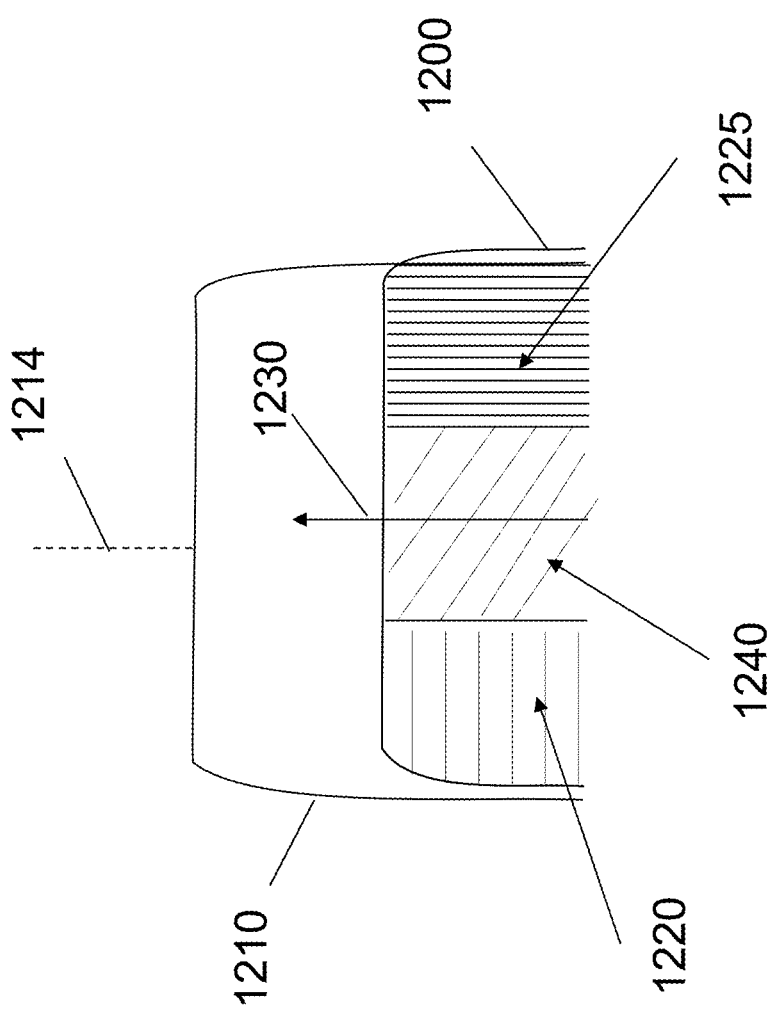
FIG. 12 is a schematic view of a spectrum of the transmitted optical channel signal with a middle sub-band.

Referring now to FIG. 12, in at least one embodiment, two sub-bands 1220, 1225 of the transmitted optical channel signal 1200 may be separated by a middle sub-band 1240. The pilot tones may be applied to the sub-bands 1220, 1225 while no pilot tone is applied to the middle sub-band 1240. In other words, in such embodiment, the middle portion of the transmitted optical channel signal 1200 is not modulated by any pilot tone, while the pilot tones are applied outside of the middle portion of the transmitted optical channel signal 1200.

The two sub-bands 1220, 1225 may be symmetrical about a reference frequency 1230. For example, the sub-band 1240 may occupy approximately 80% of the entire transmitted optical channel signal 1200. In that case, each of the two sub-bands 1220, 1225 may occupy 10% of the entire optical channel signal 1200. The optical filter's passband 1210 with a center frequency 1214 is shown for reference in FIG. 12.

The sensitivity to the power mismatch between the first and second pilot tones is expected to be improved because the pilot tones are applied in narrower sub-bands 1220 and 1225, located at the edges of the transmitted optical channel signal 1200.

Figure 13:
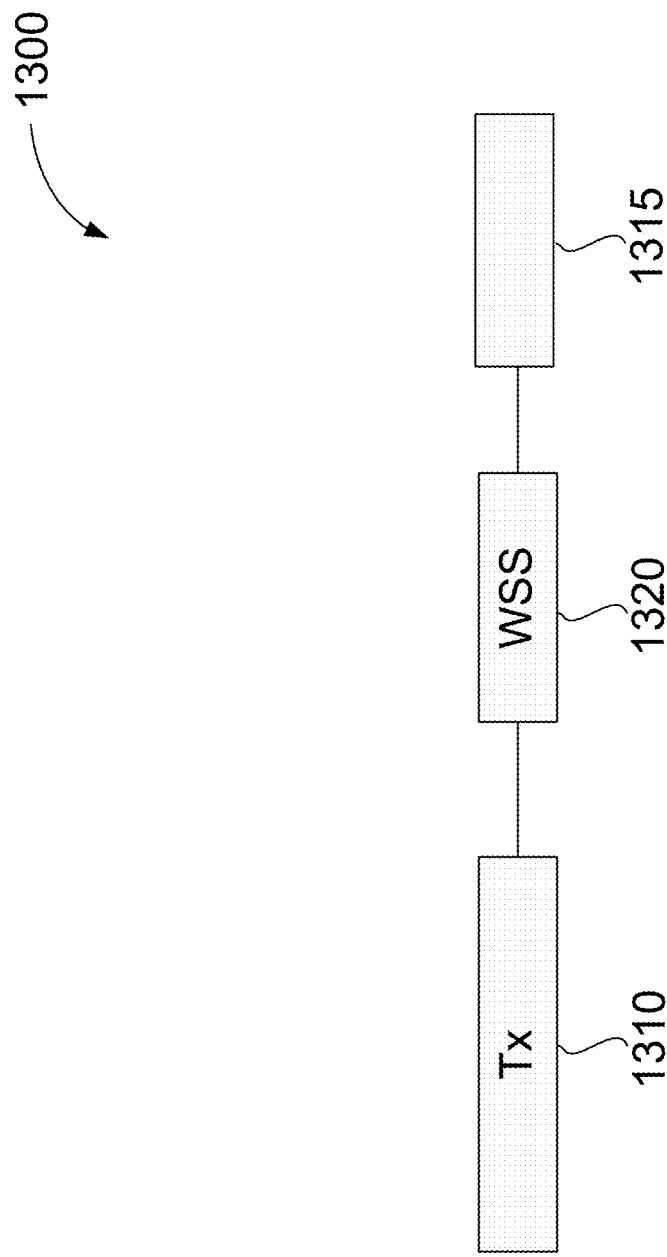
FIG. 13 is a schematic block diagram of a system used for a proof-of-concept experiment.

Referring now to FIG. 13, shown therein is a schematic block diagram of a system 1300 used for a proof-of-concept demonstration. An optical signal quadrature phase-shift keying (QPSK) modulated at 34 Gbaud is generated by a transmitter Tx 1310 and transmitted through a 50 GHz WSS 1320. The signal is received by the optical network equipment monitoring apparatus 1315.

In at least one embodiment, the system 1300 may be used for calibration of the curve of power mismatch 1110 of FIG. 11 vs. detuning/offset of the optical filter.

Figure 14B:
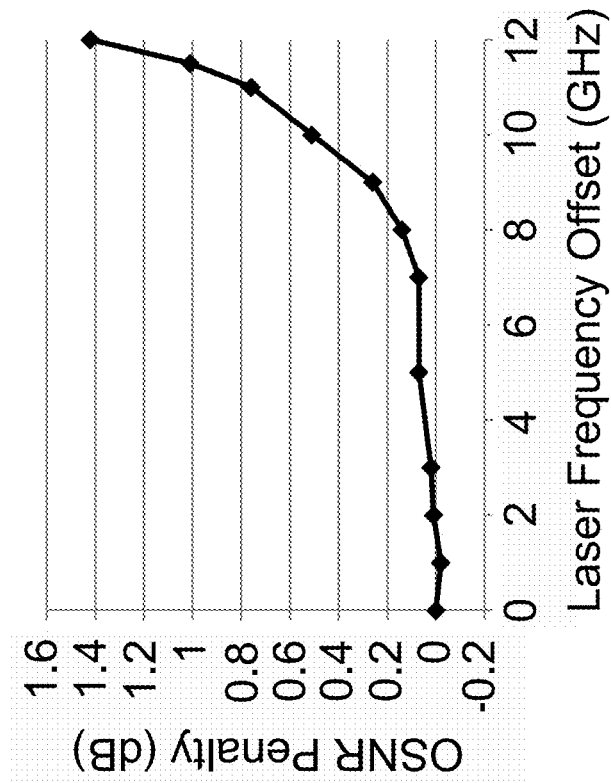
FIG. 14B is a measured optical signal-to-noise ratio (OSNR) penalty as a function of the laser frequency offset.
Figure 14A:
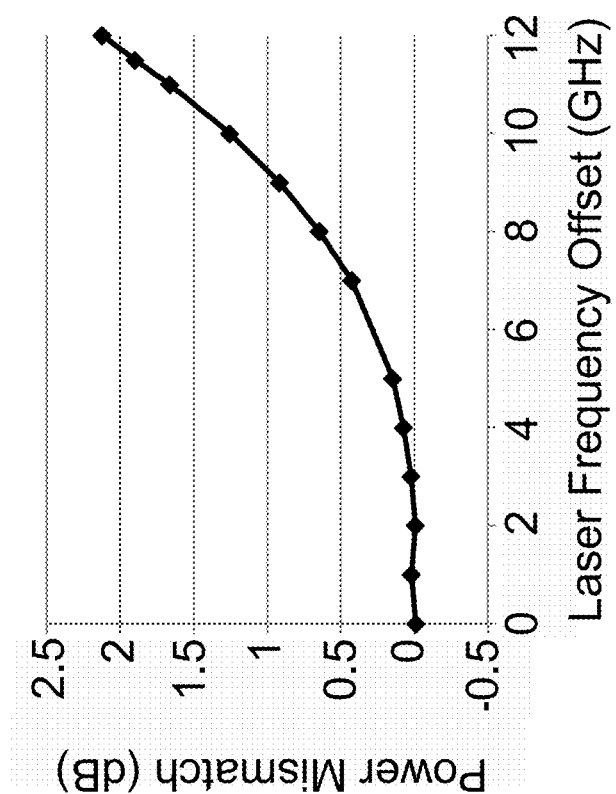
FIG. 14A is a measured power mismatch of the received first and second pilot-tone powers as a function of a laser frequency offset.
Figure 14C:
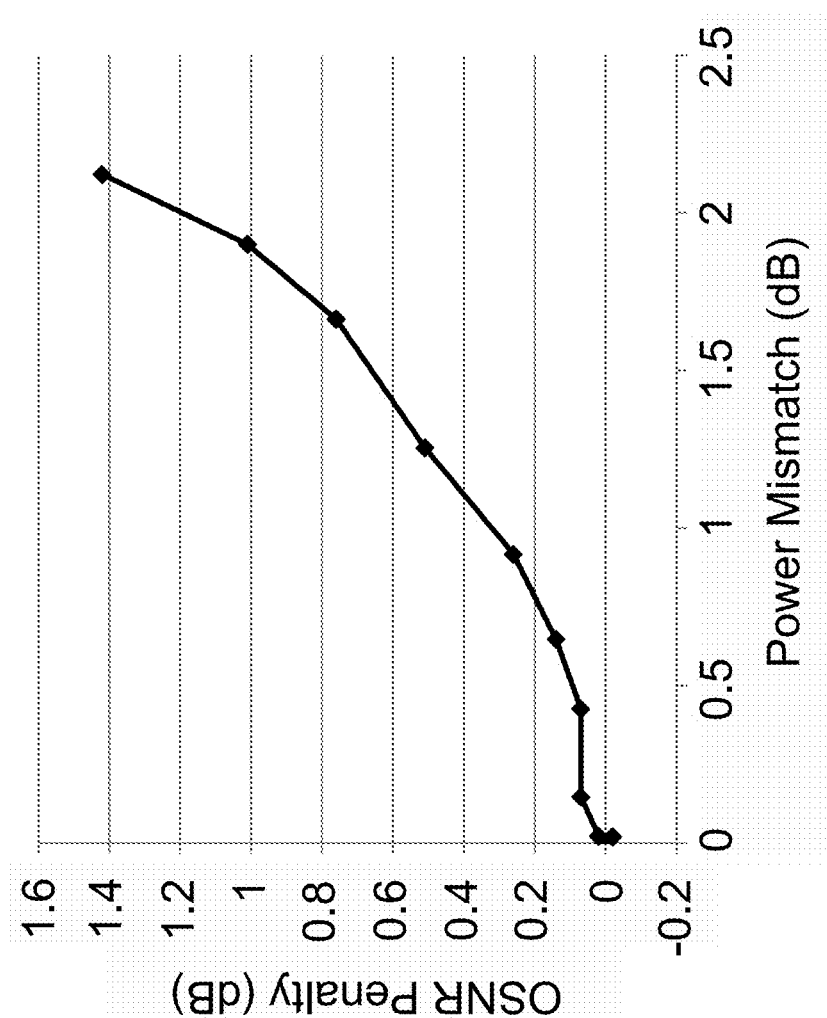
FIG. 14C is the measured OSNR penalty as a function of the measured power mismatch.

FIG. 14A shows a measured power mismatch of the received first and second pilot-tone powers as a function of a laser frequency offset. FIG. 14B shows a measured optical signal-to-noise ratio (OSNR) penalty as a function of the laser frequency offset. FIG. 14C shows the measured OSNR penalty as a function of the measured power mismatch.

To obtain the results shown in FIGS. 14A-14C, two pilot tones were applied to the transmitted optical channel signal 300 of FIG. 3. One pilot tone was applied to the first sub-band 320, located on one side of the central frequency 330. Another pilot tone was applied to the second sub-band 325 located on another side of the central frequency 330. The pilot tone powers $P_1$, $P_2$ in linear units were measured and a power mismatch in decibel (dB) was calculated using the following formula:

$$\text{power mismatch} = 10 * \log_{10}(P_1/P_2) \quad (1)$$

When the received optical signal was averaged over relatively long time (e.g., several seconds), the power could be measured with precision of about or less than 0.05 dB. The detected frequency offset may lead to about or less than 0.1 dB OSNR penalty.

In an embodiment, the optical network 100 in general and the optical devices (e.g. WSS of the ROADM 10) in particular may be calibrated offline before transmitting any information. For example, the relative frequency offset as a function of the power mismatch may be measured and stored in the memory 740 of the optical network equipment monitoring apparatus 700 as calibration data. During the actual transmission of the information over the optical network 100, the processor 720 may analyze the measured power mismatch of the received optical channel signal 350. The processor 720 may compare the measured data with the stored calibration data in order to determine the relative frequency offset and/or penalty caused by the relative frequency offset.

Referring back to FIGS. 1 and 2, in a typical optical network 100 there may be many optical filters which are part of various devices, such as WSSs of the ROADMs 10. In at least one embodiment, there may be more than one optical network equipment monitoring apparatuses 700 installed throughout the optical network 100. Each of the optical network equipment monitoring apparatuses 700 may be configured to detect a detuning or a fault (failure) of a particular optical filter.

In at least one embodiment, one master processor may collect the relative frequency offset data from a plurality of optical network equipment monitoring apparatuses 700 when the optical signal passes through a plurality of corresponding optical devices (e.g. filters). For example, the master processor may be the processor 720 of one of the optical network equipment monitoring apparatuses 700.

The relative frequency offset data received from several optical network equipment monitoring apparatuses 700 may be analyzed to recommend a correction (e.g. which frequency shift to apply deliberately to particular filters) in order to reduce the relative frequency offset and/or reduce the relative frequency offset's impact on the optical channel signal. For example, the master processor may determine one or more optical network equipment tuning parameters to be applied to the optical network equipment in order to reduce the relative frequency offset and/or reduce the relative frequency offset's impact on the optical channel signal.

Figure 15:
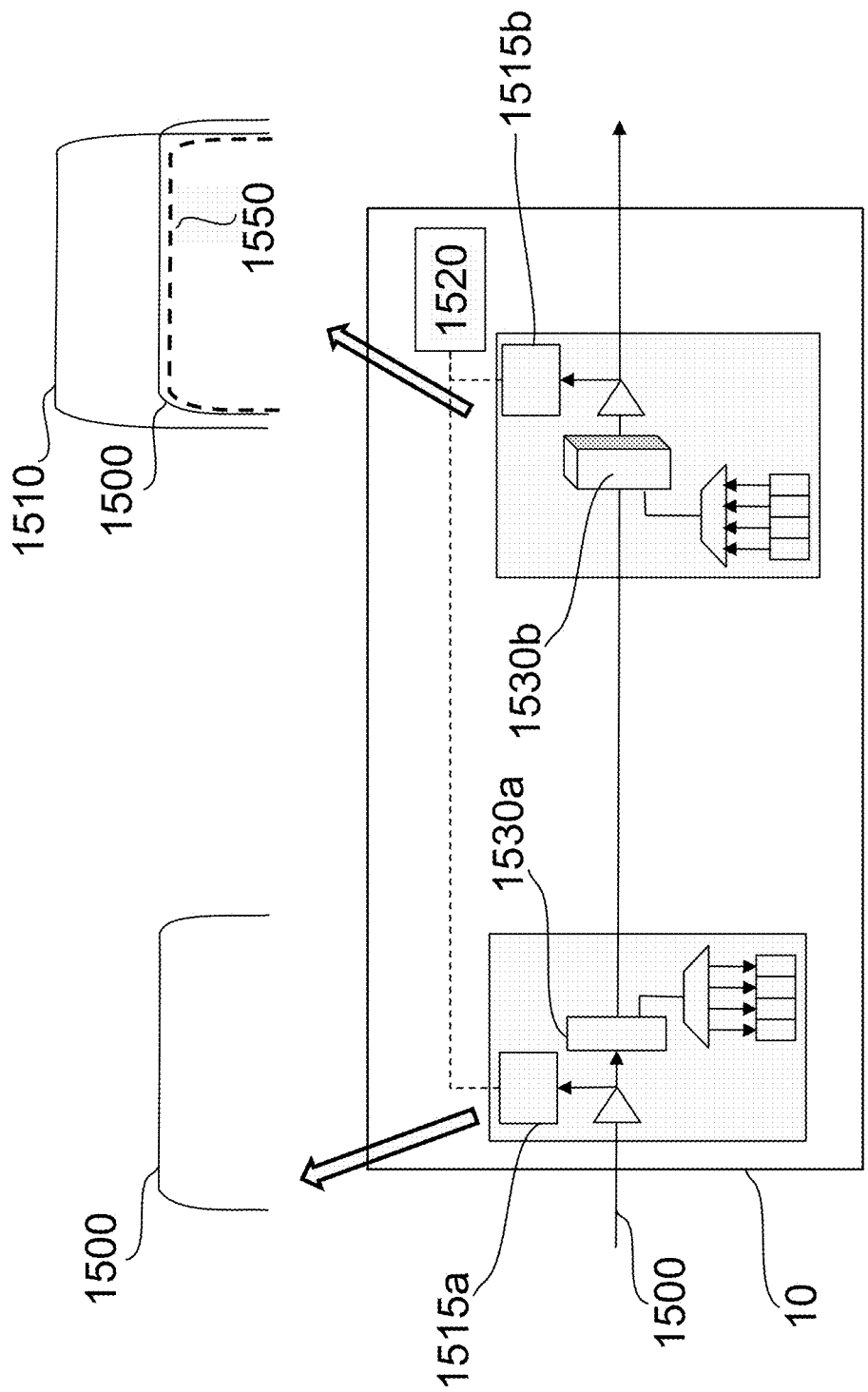
FIG. 15 is a schematic block diagram of the ROADM of FIG. 2.

Referring to FIG. 15, shown therein is a schematic block diagram of a ROADM 10 with two optical network equipment monitoring apparatuses 1515a and 1515b. In one embodiment, the power mismatch 1110 may be detected before and after the optical channel signal 1500 passes through the ROADM 10 and therefore through particular WSS 1530a and 1530b (e.g. WSS 1530b may have a WSS passband 1510). This may permit to localize a fault of one or more devices of the optical network 100.

In at least one embodiment, a master processor 1520 may collect data from the optical network equipment monitoring apparatuses 1515a and 1515b. The master processor 1520 may determine, before the optical channel signal 1500 passes through the optical device 1530a, that there is no relative frequency offset. The master processor 1520 may alternatively determine that there is an acceptable relative frequency offset of the optical channel signal 1500. The master processor 1520 may further detect that the received optical channel signal 1550 has a significant (higher than the frequency offsets threshold 1126 and/or 1128) relative frequency offset after the signal passes through the optical device 1530b.

For example, the master processor 1520 may determine whether there is a fault in a particular ROADM 10. The master processor 1520 may receive pilot tone measurements and/or power mismatch values from the network equipment monitoring apparatuses 1515a and 1515b. The master processor 1520 may then compare the relative frequency offsets before and after the optical channel signal passes through the ROADM 10. It should be understood that the processor 720 of any optical network equipment monitoring apparatuses 1515a and 1515b may be the master processor 1520 if it is configured to receive data from one or more other optical network equipment monitoring apparatuses 1515a and 1515b.

In at least one embodiment, a frequency offset of each of the optical filters of the optical network 100 may be detected.

If the system detects an excessive frequency offset in optical devices of the optical network 100, it may determine that there is a need to tune the optical devices and/or the signal. The system may then determine values of frequency shifts needed to be attained in order to correct the asymmetric filtering. Two examples of possible scenarios of frequency offsets in an optical network 100 are shown at FIGS. 16 and 17.

Figure 16:
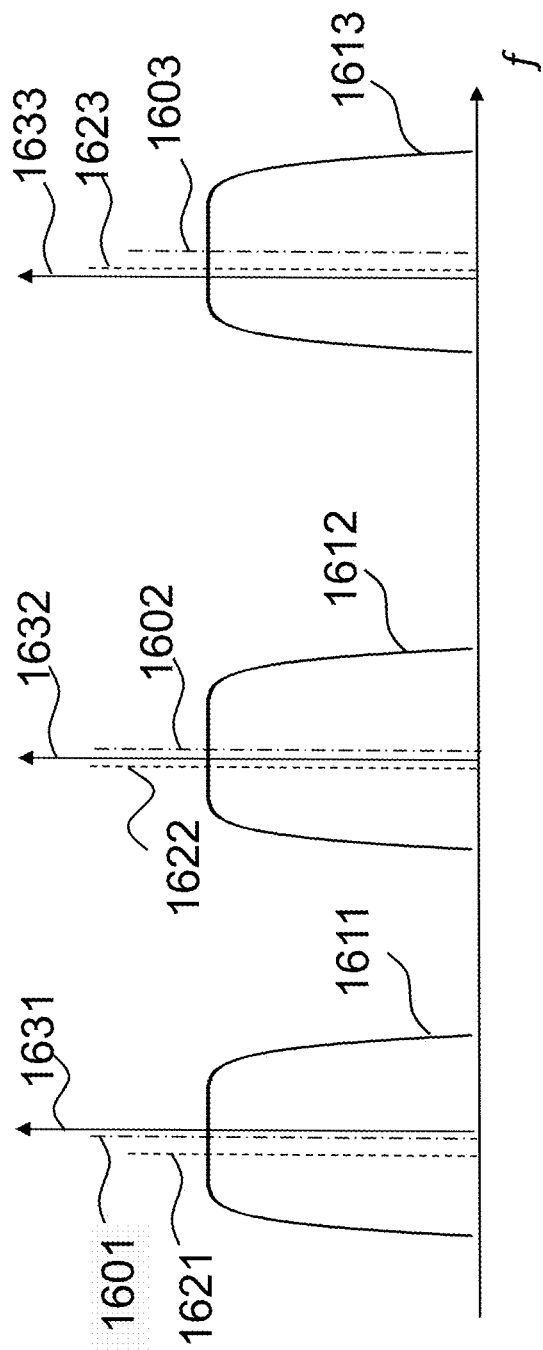
FIG. 16 is a schematic view of an optical signal with three different channels propagating through one wavelength-selective switch (WSS)

Referring to FIG. 16, a spectral plot of an optical signal includes several wavelength channels propagating through a single WSS. In this example, central frequencies 1601, 1602, 1603 of three filter passbands 1611, 1612, 1613 of the single WSS have the same center frequency offset from the ITU-grid frequencies 1621, 1622, 1623. At the same time, the transmitted channels of the optical signal having respective center frequencies 1631, 1632, 1633 have different frequency offsets from the ITU-grid frequencies 1621, 1622, 1623. In this example, the relative frequency offset is different for each of the filter passbands 1611, 1612, 1613. Therefore, the system may need to determine the relative frequency offset for each of the filter passbands 1611, 1612, 1613.

Figure 17:
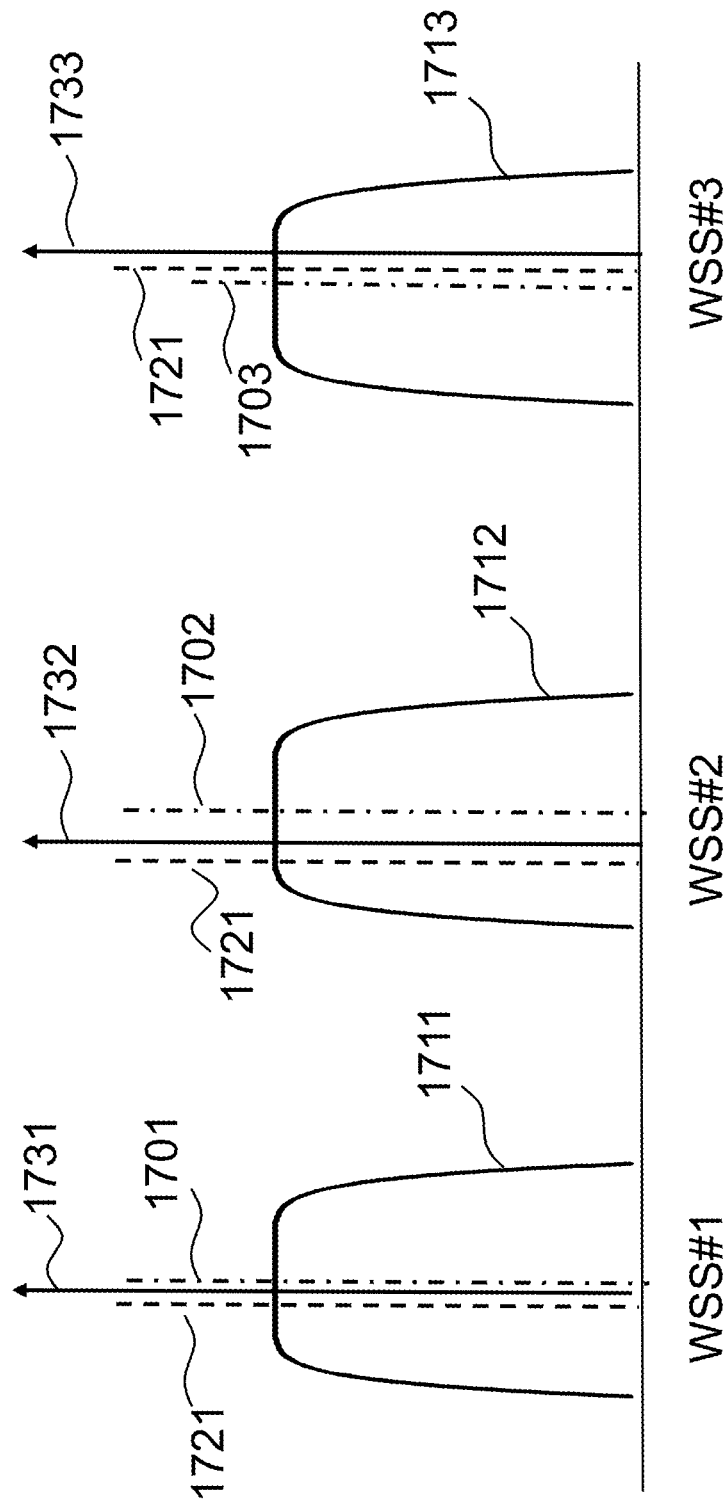
FIG. 17 is a schematic view of an optical signal traversing three WSSs.

Referring now to FIG. 17, shown therein is a schematic view of a signal traversing three (3) distinct WSSs, WSS #1, WSS #2 and WSS #3, with respective central frequencies 1701, 1702, 1703, where the frequency offset of the signal center frequency 1731, 1732, 1733 from the ITU-grid frequency 1721 is the same, while the central frequencies 1711, 1712, 1713 of the three (3) WSSs have different offsets from the ITU-grid frequency 1721. After traversing these three WSSs, the signal may experience significant spectrum narrowing. Therefore, the system may need to determine relative frequency offset for each WSS.

In at least one embodiment, the master processor 1520 may analyze such relative frequency offsets for a plurality of channels in a plurality of optical filters. The data generated based on the relative frequency offsets may be used to detect the need to tune the optical devices in the optical network 100 in case of asymmetric filtering. The optical devices may be, for example, lasers and/or filters.

For example, based on such analysis, the master processor 1520 may determine one or more optical filter adjustment shifts that may need to be applied to one or more optical filters in the optical network 100. The master processor 1520 may determine the optical filter adjustment shift by using the relative frequency offsets, without the need to determine absolute frequency offsets of the filters in the optical network 100.

Measuring an optical channel signal spectrum may help to analyze performance of the optical network equipment of the optical network 100. The shape of the optical channel signal spectrum may provide information on the impact (such as, for example, spectrum narrowing) of one or more individual optical filters on the optical network performance. Spectrum narrowing, and in particular, symmetric spectrum narrowing, may be detected based on analysis of the optical channel signal spectrum.

In at least one embodiment, optical channel spectra may be measured and determined, as described herein, before and after the optical channel signal has propagated through specific optical network equipment. The spectra before and after the propagation of the optical channel signal through the specific optical network equipment may be compared to each other in order to detect the spectrum narrowing.

To measure the optical channel signal spectrum, a probing pilot tone may be applied consecutively to each probing sub-band of the optical channel signal. A spectrum-related position of the probing pilot tone with respect to the optical channel signal spectrum may vary with time. The spectrum of the received optical channel signal may be obtained based on time-varying power level (i.e. power level as a function of time) of the probing pilot tone after the optical channel signal has propagated through optical network equipment.

Figure 18:
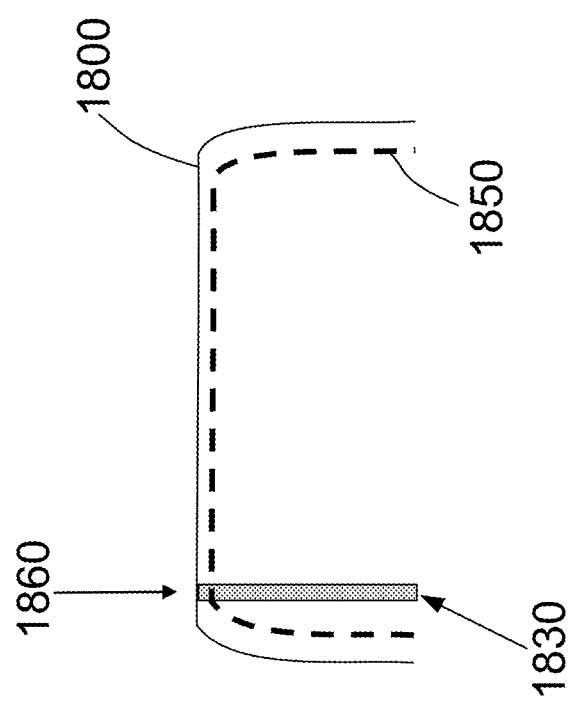
FIG. 18 is schematic view of a transmitted and received optical channel signal with a pilot tone being applied to one of the probing sub-bands of the transmitted optical channel signal, in accordance with one embodiment.

FIG. 18 illustrates a transmitted optical channel signal 1800 with a probing pilot tone 1860 applied to one of the probing sub-bands 1830 of the transmitted optical channel signal 1800, in accordance with one embodiment. The entire band of the transmitted optical channel signal 1800 may have a plurality of probing sub-bands 1830. In at least one embodiment, the probing pilot tone 1860 may be applied consecutively to consecutive probing sub-bands 1830 of the transmitted optical channel signal 1800. FIG. 18 also shows an example of a received optical channel signal 1850 after the propagation through the optical network equipment that has caused the symmetric spectrum narrowing.

Figure 19:
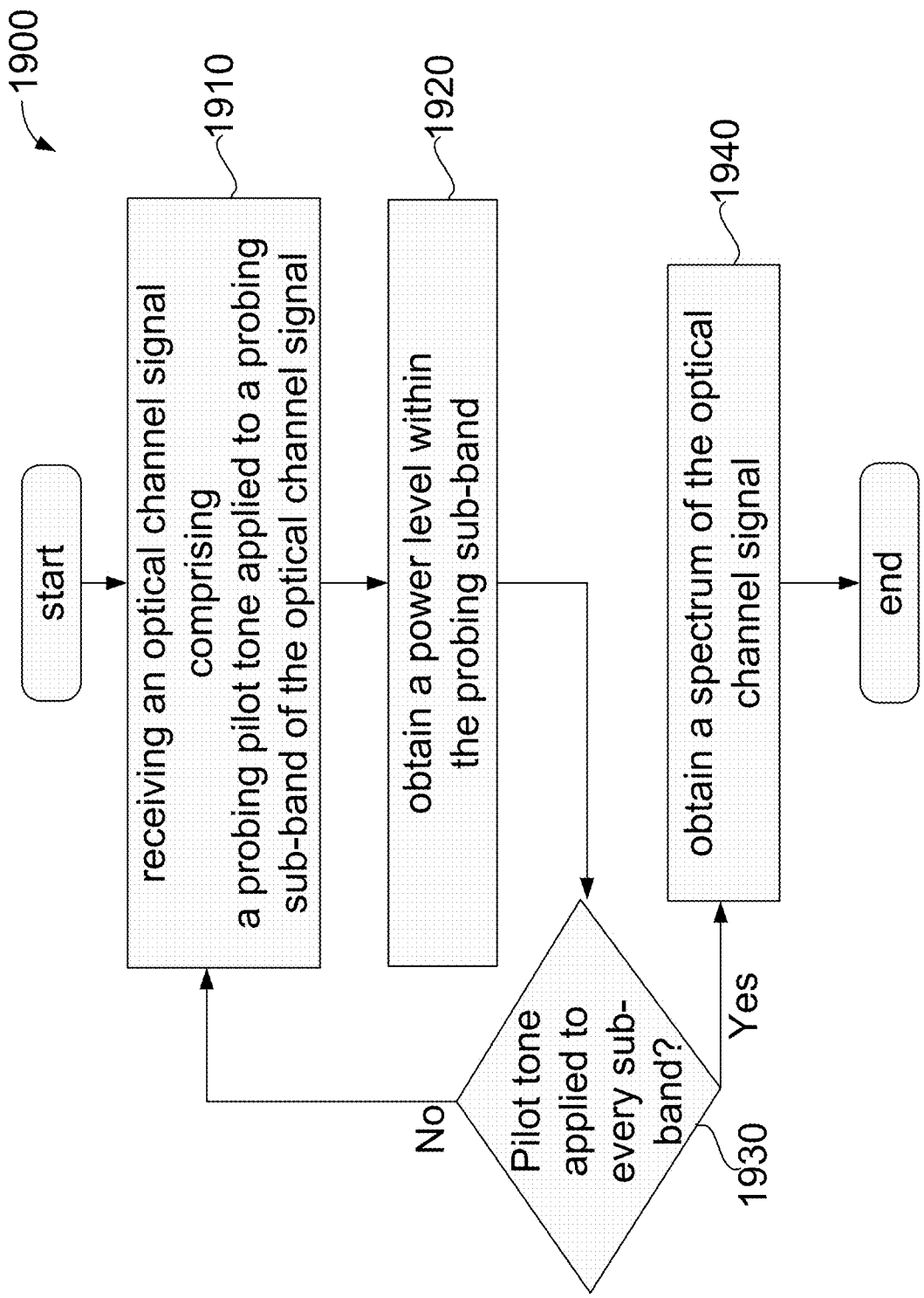
FIG. 19 is a sequence diagram of an optical spectrum monitoring method, in accordance with one embodiment.

Referring to FIG. 19, shown therein is an optical spectrum monitoring method 1900, in accordance with one embodiment. At operation 1910, an optical channel signal 1850 is received by the processor 720. The optical channel signal 1850 comprises the probing pilot tone 1860 applied to a probing sub-band 1830. At operation 1920, the power level of the probing pilot tone 1860 within the probing sub-band 1830 is determined. Operation 1930 determines whether the probing pilot tone 1860 has been applied to each selectable probing sub-band 1830 of the entire spectral band of the transmitted optical channel signal 1800. If not, operations 1910 and 1920 are repeated where the probing pilot tone 1860 is applied to a next probing sub-band 1830. If the operation 1930 determines that the probing pilot tone 1860 has been applied to each selectable probing sub-band 1830 of the entire spectral band of the transmitted optical channel signal 1800, the spectrum of the received optical channel signal 1850 is obtained at operation 1940. The spectrum of the received optical channel signal 1850 includes, for each selectable probing sub-band 1830, the corresponding power level of the probing pilot tone 1860, determined at operation 1920.

In at least one embodiment, an additional probing pilot tone (another probing pilot tone in addition to the probing pilot tone 1860) may be applied consecutively to different probing sub-bands of a second plurality of probing sub-bands of the transmitted optical channel signal 1800. The spectrum of the received optical channel signal 1850 may be thus obtained at operation 1940 based on time-varying power levels of the probing pilot tone 1860 and the additional probing pilot tone.

Figure 20:
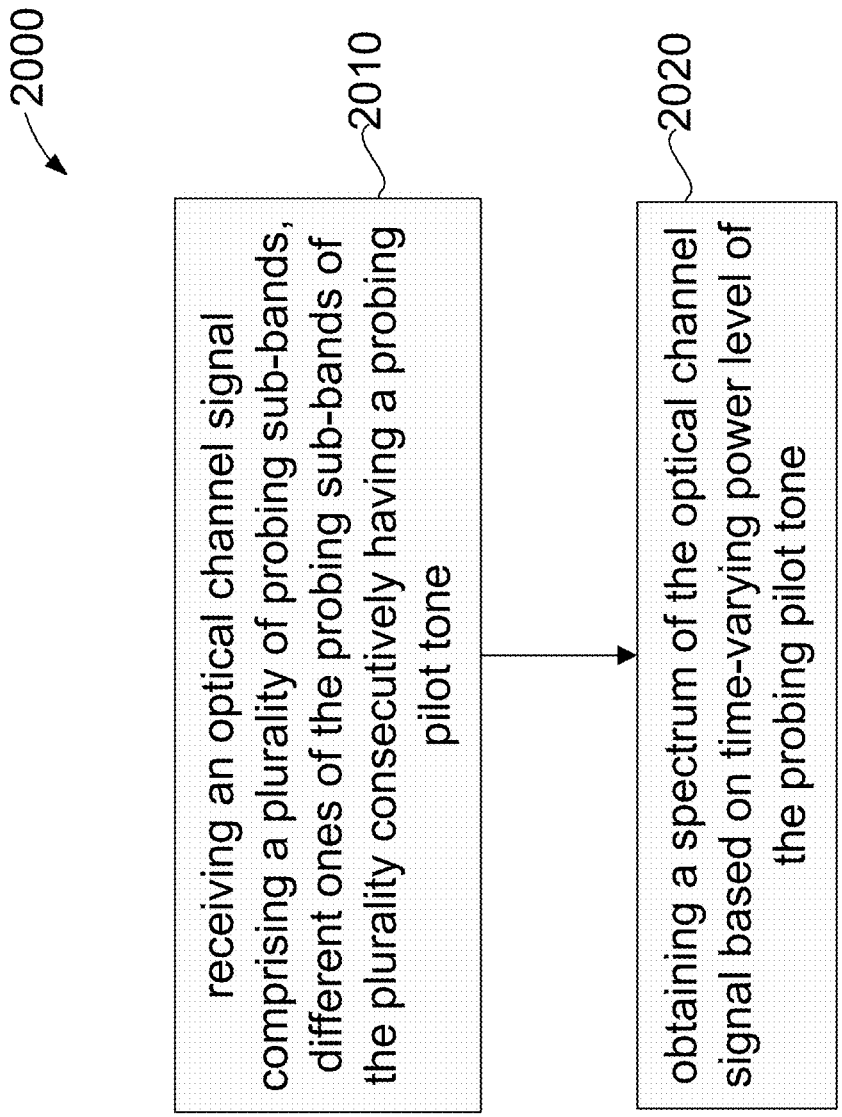
FIG. 20 is a sequence diagram of the optical spectrum monitoring method, in accordance with another embodiment.

Referring to FIG. 20, shown therein is an optical spectrum monitoring method 2000, in accordance with one embodiment. At operation 2010, an optical channel signal 1850 is received. The received optical channel signal 1850 has a probing pilot tone 1860 having been applied consecutively to different probing sub-bands 1830 of a plurality of probing sub-bands 1830. At operation 2020, the spectrum of the received optical channel signal 1850 is obtained based on power levels of the first probing pilot tone 1860 determined over time.

Figure 21:
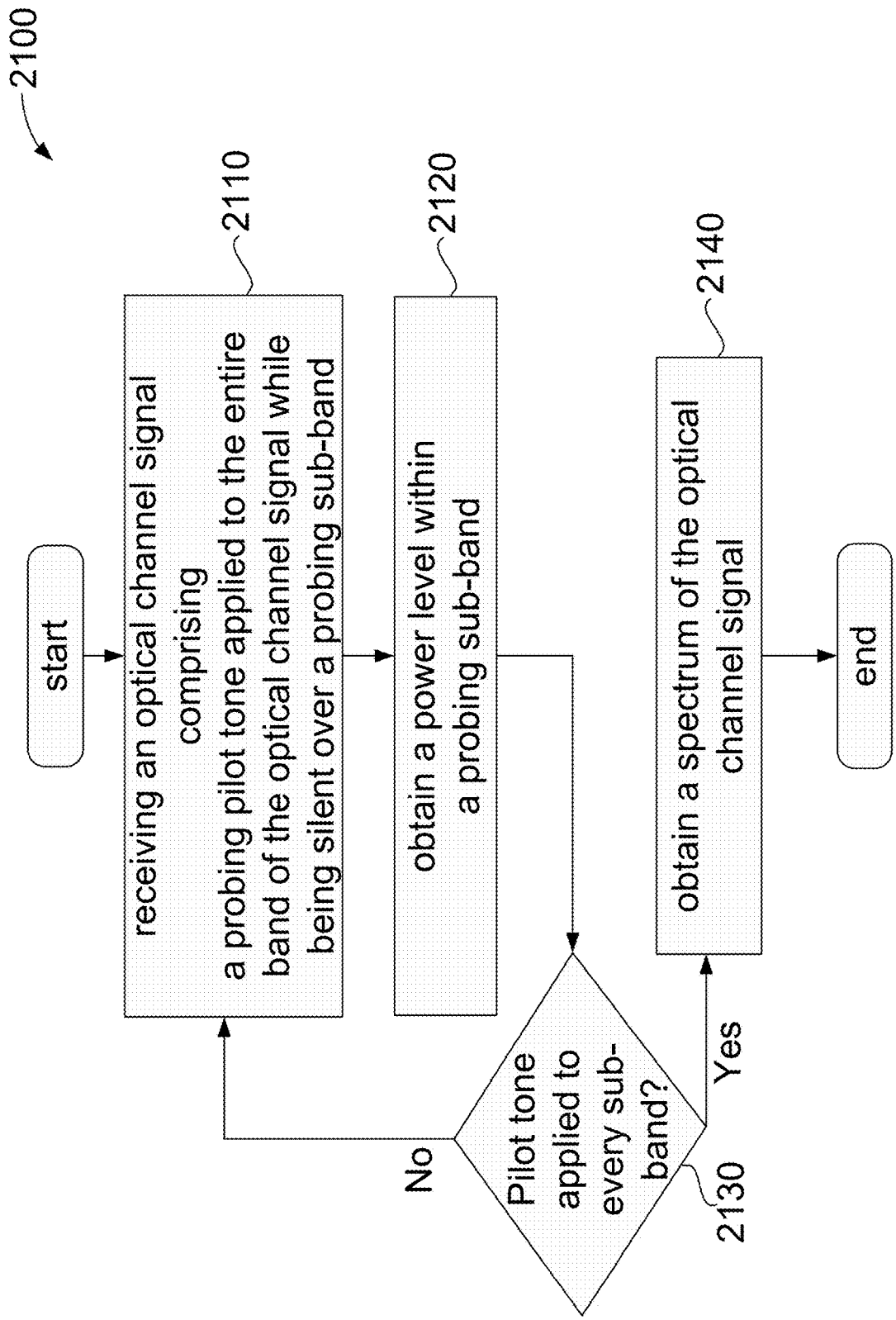
FIG. 21 is a sequence diagram of the optical spectrum monitoring method, in accordance with a further embodiment.

FIG. 21 schematically shows a method 2100 of obtaining an optical spectrum of the received optical channel signal 1850, in accordance with another embodiment. In this embodiment, the probing pilot tone 1860 is applied during a probing time interval to the entire spectral band of the transmitted optical channel signal 1800, excluding the probing sub-band 1830. In other words, at operation 2110, the optical channel signal 1850 is received with the probing pilot tone 1860 applied over the entire band, with the exception that the probing pilot tone 1860 is silent over a first probing sub-band 1830.

At operation 2120, the power level of the probing pilot tone 1860 within the received optical channel signal 1850 is determined. Operation 2130 determines whether or not silencing of the probing pilot tone 1860 has occurred in each selectable probing sub-band 1830 of the entire spectral band of the transmitted optical channel signal 1800. If not, operations 2110 and 2120 are repeated, where the probing pilot tone 1860 is applied to the transmitted optical channel signal 1800, while the probing pilot tone is silent in a next probing sub-band 1830. After the operation 2130 determines that the probing pilot tone 1860 has been silenced in each selectable probing sub-band 1830 of the entire spectral band of the transmitted optical channel signal 1800, the spectrum of the received optical channel signal 1850 is obtained at operation 2140. The spectrum of the received optical channel signal 1850 shows, for each selectable probing sub-band 1830, the corresponding power level of the probing pilot tone 1860 while the probing pilot tone 1860 is silent in that probing sub-band 1830.

In at least one embodiment, during a reference time interval, the probing pilot tone 1860 may be applied to the entire spectral band of the transmitted optical channel signal 1800, including all selectable probing sub-bands 1830. A reference power level of the probing pilot tone 1860 is determined during this reference time interval. To obtain a power level within a given probing sub-band 1830 at operation 2120, the power level of the probing pilot tone 1860 present in the entire spectral band, excluding the given probing sub-band 1830, is deducted from the reference power level. The probing time interval and the reference time interval may follow each other and may be consecutively repeated for averaging the measured power levels. The operations 2110, 2120 may be repeated for each of the probing sub-bands 1830 selectable in the entire spectral band of the received optical channel signal 1850.

FIG. 22 shows a sequence diagram of an optical spectrum monitoring method 2200, in accordance with another embodiment. At operation 2210, an optical channel signal 1850 with a first plurality of probing sub-bands 1830, collectively forming an entire band of the received optical channel signal 1850, is received. In such received optical channel signal 1850, the probing pilot tone 1860 is present over the entire band, while being silent consecutively over each one of the probing sub-bands 1830 of the first plurality of probing sub-bands. The spectrum of the received optical channel signal 1850 is obtained at operation 2220 based on power levels of the probing pilot tone 1860. The probing pilot tone 1860 in this embodiment is determined over time as silenced consecutively in the different probing sub-bands 1830.

In the optical spectrum monitoring methods 1900, 2000, 2100, 2200, at operations 1910, 2010, 2110, 2210, respectively, the processor 720 may also receive a probing sub-band identifier (not shown) with information about the probing sub-band 1830. The probing sub-band identifier may include information about a position of the particular probing sub-band 1830 within the spectrum of the optical channel signal 1850. The processor 720 may digitally extract the probing sub-band identifier from the pilot tone. For example, one or more bits of the pilot tone may contain the probing sub-band identifier.

Figure 23:
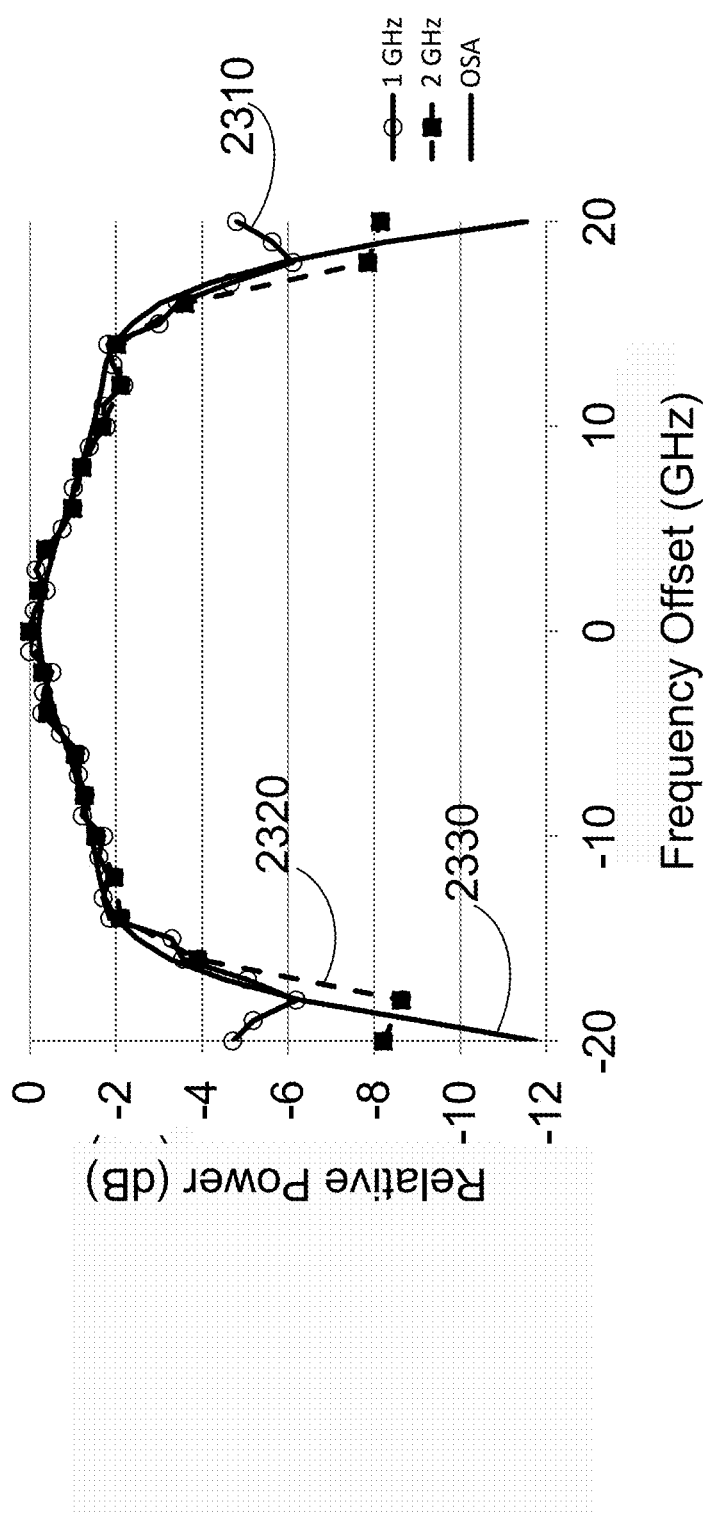
FIG. 23 is an optical channel spectral plot obtained using an optical spectrum monitoring method of the present disclosure, overlapped with an optical channel spectral plot obtained using an optical spectrum analyser.

FIG. 23 shows an example of optical spectra of the received optical channel signal 1850 obtained with the optical spectrum monitoring method 2000. The optical spectrum 2310 was obtained with the optical spectrum monitoring method 2000 with probing sub-bands of 1 GHz and the optical spectrum 2320 was obtained with 2 GHz probing sub-bands. For comparison, an optical spectrum 2330 of the same received optical channel signal 1850, measured with a commercially available optical spectrum analyser (OSA), is also shown at FIG. 23. The shapes of the optical spectra 2310, 2320, measured with optical spectrum monitoring method 2000, are similar to the OSA-obtained optical spectrum 2330.

The optical spectra obtained with the optical spectrum monitoring methods 1900, 2000, 2100, 2200 may be further analyzed by the processor 720. The optical spectra may be stored in the memory 740 and/or displayed on a screen (not shown). The processor 720 may further compare the obtained optical spectra with a calibration spectrum, which may be previously stored in the memory 740. In at least one embodiment, the processor 720 may determine a bandwidth of the obtained optical spectra and compare the bandwidth to a bandwidth threshold. The bandwidth threshold may be stored in the memory 740.

In at least one embodiment, at least one of the optical spectrum monitoring methods 1900, 2000, 2100, 2200 may be applied along with, or following, the method of monitoring the performance of optical network equipment 900, 1000. This may permit to determine and then analyze both the power mismatch and the optical spectrum of the received optical channel signal. If the relative frequency offset has been determined to be less than a minimum frequency offset threshold, the processor 720, 1520 may proceed with determining and analyzing the optical spectrum with the optical spectrum monitoring method 1900, 2000, 2100, 2200.

Other characteristics related to the optical spectrum (for example, characteristics related to a shape of the optical spectrum) of the received optical channel signal 1850 may be compared to respective one or more characteristic thresholds. Such respective characteristic thresholds may be stored in the memory 740. An alarm may be generated if one or more of the characteristics of the determined optical spectrum exceeds respective characteristic threshold.

Each of the methods described in FIGS. 9, 10, 19-22 comprises a plurality of operations that may be executed in variable order, some of the operations possibly being executed concurrently, some of the operations being optional. Each of the operations described in these Figures may be configured to be processed by one or more processors, the one or more processors being coupled to a memory.

It should be noted that a "processor" as referred to herein may comprise the processor 720 of the optical network equipment monitoring apparatus 700, an external processor, or both. The external processor and the processor 720 may be digital signal processors (also referred to herein as a "DSP"), FPGAs or like component capable to perform a digital signal processing.

Various implementations of methods and apparatuses for monitoring performance of optical network equipment as disclosed herein may be envisioned, as expressed in the following paragraphs.

In some implementations, the optical channel signal may comprise a second plurality of probing sub-bands, different ones of the first plurality of probing sub-bands, the second plurality of probing sub-bands consecutively having a second probing pilot tone. The spectrum of the optical channel signal may be obtained based on time-varying power levels of the first and second probing pilot tones.

In some implementations, the optical channel signal may comprise a second plurality of probing sub-bands collectively forming the entire band of the optical channel signal, a second probing pilot tone being present over the entire band of the optical channel signal while being silent consecutively over each one of the probing sub-bands of the second plurality. The spectrum of the optical channel signal may be obtained based on time-varying power levels of the first and second probing pilot tones.

In some implementations, the optical channel signal may comprise a middle spectral sub-band located between the first spectral sub-band and the second spectral sub-band of the optical channel signal.

Those of ordinary skill in the art will realize that the description of the methods, systems and apparatuses for monitoring performing of optical networks are illustrative only and are not intended to be in any way limiting. Other embodiments will readily suggest themselves to such persons with ordinary skill in the art having the benefit of the present disclosure. Furthermore, the disclosed methods, systems and apparatuses for monitoring performing of optical networks may be customized to offer valuable solutions to existing needs and problems related to monitoring performance of optical networks. In the interest of clarity, not all of the routine features of the implementations of the methods, systems and apparatuses for monitoring performing of optical networks are shown and described. In particular, combinations of features are not limited to those presented in the foregoing description as combinations of elements listed in the appended claims form an integral part of the present disclosure. It will, of course, be appreciated that in the development of any such actual implementation of the methods, systems and apparatuses for monitoring performing of optical networks, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of optical networks having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

Systems and modules described herein may comprise software, firmware, equipment, or any combination(s) of software, firmware, or equipment suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Storage medium and memory described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A method of monitoring performance of an optical network having an optical filter, comprising:
    receiving an optical channel signal, the optical channel signal comprising:
        a first pilot tone modulating a first spectral sub-band of the optical channel signal, and
        a second pilot tone modulating a second spectral sub-band of the optical channel signal, the first and the second spectral sub-bands being on opposite sides of a reference frequency of the optical channel signal;
    monitoring performance of optical network equipment based on a calculated power ratio between the first and second pilot tones of the received optical channel signal.

2. The method of claim 1, wherein:
    the first pilot tone has a first pilot tone frequency; and
    the second pilot tone has a second pilot tone frequency different from the first pilot tone frequency.

3. The method of claim 2, wherein the first and second pilot tones are present simultaneously in the respective first and second spectral sub-bands of the optical channel signal.

4. The method of claim 1, wherein:
    the first pilot tone is present during a first time interval; and
    the second pilot tone is present during a second time interval different from the first time interval.

5. The method of claim 1, wherein the reference frequency is a center frequency of the transmitted optical channel signal.

6. The method of claim 1, wherein the optical network equipment comprises an optical filter, the method further comprising determining a relative frequency offset of a filter bandwidth of the optical filter based on the power ratio.

7. A system comprising:
    a transmitter configured to transmit an optical channel signal over an optical network, the optical channel signal comprising:
        a first pilot tone to modulate a first spectral sub-band of the optical channel signal, and
        a second pilot tone to modulate a second spectral sub-band of the optical channel signal, the first and the second spectral sub-bands being on opposite sides of a reference frequency of the optical channel signal;
    a photodetector configured to receive the optical channel signal; and
    a processor configured to monitor performance of optical network equipment based on a calculated power ratio between the first and second pilot tones of the optical channel signal received by the photodetector.

8. The system of claim 7, wherein the optical network equipment comprises an optical filter, and wherein the processor is further configured to determine a relative frequency offset of a filter bandwidth of the optical filter based on the power ratio.

9. An optical network equipment monitoring apparatus comprising:
    a photodetector configured to receive an optical channel signal comprising:
        a first pilot tone modulating a first spectral sub-band of the optical channel signal, and
        a second pilot tone modulating a second spectral sub-band of the optical channel signal, the first and the second spectral sub-bands being on opposite sides of a reference frequency of the optical channel signal; and
    a processor configured to monitor performance of an optical network equipment based on a calculated power ratio between the first and the second pilot tones of the received optical channel signal.

10. The apparatus of claim 9, wherein the processor is further configured to determine a relative frequency offset of the optical channel signal based on the power ratio.

11. The apparatus of claim 10, wherein the processor is further configured to generate an alarm if the relative frequency offset exceeds a frequency offset threshold.

12. The apparatus of claim 9, wherein the optical network equipment comprises an optical filter, and wherein the processor is further configured to monitor performance of the optical filter.

13. The apparatus of claim 12, wherein the processor is further configured to determine a relative frequency offset of a filter bandwidth of the optical filter based on the power ratio.

14. The apparatus of claim 9, wherein the optical network equipment comprises at least one of a wavelength selective switch, an arrayed waveguide grating, and a laser light source of an optical network, and wherein the processor is further configured to monitor performance of the at least one of the wavelength selective switch, the arrayed waveguide grating, and the laser light source of an optical network, respectively.

15. A non-transitory computer readable medium with computer executable instructions stored thereon that, when executed by a processor, cause the processor to:
   obtain an amplitude of a first pilot tone modulating a first spectral sub-band of an optical channel signal;
   obtain an amplitude of a second pilot tone modulating a second spectral sub-band of the optical channel signal, the first and the second spectral sub-bands being on opposite sides of a reference frequency of the optical channel signal; and
   monitor performance of an optical network equipment based on a calculated power ratio between the first and the second pilot tones of the received optical channel signal.

16. The non-transitory computer readable medium of claim 15, wherein the executable instructions cause the processor to detect at least one of:
   a relative frequency offset between the optical channel signal and a filter bandwidth of an optical filter of an optical network based on the power ratio.

17. The non-transitory computer readable medium of claim 16, wherein the executable instructions cause the processor to:
   generate an alarm if the relative frequency offset exceeds a frequency offset threshold.

18. The non-transitory computer readable medium of claim 17, wherein the executable instructions cause the processor to determine at least one optical network equipment tuning parameter.

19. A method of monitoring performance of an optical network having an optical filter, comprising:
   receiving an optical channel signal, comprising:
      a first pilot tone within a first spectral sub-band of the optical channel signal, and
      a second pilot tone within a second spectral sub-band of the optical channel signal, the first and the second spectral sub-bands being on opposite sides of a reference frequency of the optical channel signal;
   calculating a power ratio between the first and second pilot tones of the received optical channel signal; and
   determining a relative frequency offset of the optical filter bandwidth based on the calculated power ratio between the first and second pilot tones.

* * * * *